US008828296B2

(12) United States Patent
Zhang et al.

(10) Patent No.: US 8,828,296 B2
(45) Date of Patent: Sep. 9, 2014

(54) METHOD OF MAKING EYEGLASS FRAME BY INJECTION MOLDING

(75) Inventors: Yan Zhang, Hong Kong (CN); Yin Sang Lam, Hong Kong (CN)

(73) Assignee: Okia Optical Company, Ltd., Hong Kong (CN)

( * ) Notice: Subject to any disclaimer, the term of this patent is extended or adjusted under 35 U.S.C. 154(b) by 345 days.

(21) Appl. No.: 13/239,384

(22) Filed: Sep. 21, 2011

(65) Prior Publication Data

US 2013/0069274 A1 Mar. 21, 2013

(51) Int. Cl.
*B29C 45/14* (2006.01)

(52) U.S. Cl.
USPC .......................................................... 264/279

(58) Field of Classification Search
CPC ............... B29C 2045/14721; B29C 45/14688; B29C 45/14811; B29L 2012/005; G02C 5/008
USPC .......................................................... 264/279
See application file for complete search history.

(56) References Cited

U.S. PATENT DOCUMENTS

| 4,059,471 A | 11/1977 | Haigh |
| 4,314,814 A * | 2/1982 | Deroode ....................... 264/132 |
| 4,529,279 A | 7/1985 | Gutbrod |
| 4,798,453 A | 1/1989 | Tokumaru |
| 4,842,784 A | 6/1989 | Takahashi |
| 5,406,337 A | 4/1995 | Metcalfe et al. |
| 5,639,403 A | 6/1997 | Ida et al. |
| 5,805,261 A | 9/1998 | Houston et al. |
| 6,066,594 A | 5/2000 | Gunn et al. |
| 6,103,390 A | 8/2000 | Kamiya et al. |
| 6,322,862 B1 | 11/2001 | Sakai |
| 6,465,102 B1 * | 10/2002 | Honigfort et al. ............ 428/412 |
| 6,916,545 B2 | 7/2005 | Yano et al. |
| 7,553,548 B2 | 6/2009 | Fukuda et al. |
| 7,691,470 B2 | 4/2010 | Goodson et al. |
| 7,753,518 B2 | 7/2010 | Lam et al. |
| 2001/0030677 A1 | 10/2001 | Inamoto |

(Continued)

FOREIGN PATENT DOCUMENTS

| CN | 2775705 Y | 4/2006 |
| CN | 2929760 Y | 8/2007 |
| KR | 1020100076432 A | 7/2010 |
| WO | 2010/078687 * | 7/2010 |

OTHER PUBLICATIONS

Written Opinion of PCT/CN2012/078189 dated Nov. 1, 2012.

*Primary Examiner* — Jill Heitbrink
(74) *Attorney, Agent, or Firm* — Kam. W. Law; Squire Sanders

(57) ABSTRACT

Disclosed herein are methods of making an eyeglass frame comprising a frame front and/or a pair of temples, wherein each of the frame front and temples independently comprises a top layer and a patterned layer having the shape of a frame front and/or a pair of temples, and wherein the patterned layer comprises a laminate and a design pattern on a surface of the laminate, the method comprising the steps of: a) providing a mold having a cavity, wherein the shape of the cavity corresponds to the shape of the frame front and/or the temples; b) setting the patterned layer for the frame front and/or the temples in the mold; and c) injecting a melt of a first polymer composition into the cavity to form the top layer. In some embodiments, at least one of the frame front and temples further comprises a bottom layer.

32 Claims, 9 Drawing Sheets

(56) References Cited

U.S. PATENT DOCUMENTS

| | | |
|---|---|---|
| 2004/0114022 A1 | 6/2004 | Uejima et al. |
| 2005/0040243 A1 | 2/2005 | Bi et al. |
| 2005/0212843 A1 | 9/2005 | Jones et al. |
| 2007/0121056 A1 | 5/2007 | Jannard et al. |
| 2007/0254140 A1* | 11/2007 | Zou .............................. 428/204 |
| 2008/0218683 A1 | 9/2008 | Lam et al. |
| 2009/0005244 A1 | 1/2009 | Ramsden |
| 2009/0174860 A1 | 7/2009 | Lam et al. |
| 2010/0245523 A1 | 9/2010 | Howell |
| 2011/0000028 A1 | 1/2011 | McAlpine et al. |

* cited by examiner

METHOD OF MAKING EYEGLASS FRAME BY INJECTION MOLDING

FIELD OF THE INVENTION

This invention relates to methods of making eyeglass frames by molding techniques, in particular, making eyeglass frames comprising a frame front and/or temples having a design pattern by injection molding. In some embodiments, the design pattern comprises one or more high-definition images.

BACKGROUND OF THE INVENTION

Eyeglasses (aka glasses or spectacles) generally can be used for vision correction and/or eye protection from hazards such as UV light or sunlight. Modern eyeglasses generally comprise a pair of lenses mounted on an eyeglass frame which can be worn in front of the wearer's eyes. The eyeglass frame may be supported by pads on the bridge of the nose and/or by temples placed over the ears.

Eyeglass frames, which may comprise a frame front and/or temples, are generally made from plastic sheets, such as sheets of cellulose acetate, by die-cutting at a temperature at or above its softening point. In general, the softened plastic sheets are fitted into a blanking machine and then a die cuts through the plastic sheets to produce blank frame fronts and/or temples according to the design of the eyeglass frame. The blank frame fronts and/or temples are then removed from the plastic sheets, and the lens portions of the blank frame fronts are then discarded as scrap. The blank frame fronts and/or temples can then be finished by a series of operations such as producing grooves on the frame fronts for holding lenses by a cutting device such as a cutter or router; and removing rough edges by a tumbling machine, an abrasive machine, polishing machine, lapping machine or a combination thereof. Such operations generate a large amount of plastic waste, especially during blanking where the bulk of the waste is in the form of the lens portion of the frame.

Furthermore, consumers generally demand eyeglass frames having design patterns appealing to human eyes. However, design patterns produced by the current technologies, e.g., silk screen printing or injection molding with design patterns printed on an outer surface of the molded article, have low resolution. Another drawback of silk screen printing is that it requires different screens for different patterns. Further, the pattern layer produced by the current injection molding process is that the pattern layer is on the outer surface protected merely by a thin protecting layer. However, the protecting layer and thus the pattern layer are generally not durable and can be worn down over time and become unappealing. As a result, the current technologies not only have poor resolution or quality, but also are complex and expensive, and/or produces images and design patterns which are undurable.

Therefore, there is always a need for new methods for making eyeglass frames that are simple and inexpensive; that produce any desirable high-definition images that are durable and design patterns; and/or that reduce or eliminate plastic waste and thus costs during the manufacturing of the eyeglass frames.

SUMMARY OF THE INVENTION

Provided herein are methods of making eyeglass frames with a significant reduction in plastic waste and thus costs during the manufacturing of the eyeglass frames. Also provided herein are methods of making eyeglass frames that are simple and inexpensive. Also provided herein are methods of making eyeglass frames that produce any desirable high-definition images and design patterns that are durable. In some embodiments, the methods comprise making eyeglass frames comprising a frame front and/or a pair of temples having a high-definition design pattern by injection molding.

In some embodiments, design patterns are printed with transfer printing as a pattern layer on a surface of a top layer, a bottom layer or a core layer between the top layer, a bottom layer. The patterned layer can be protected by the top layer and/or the bottom layer to provide clear, high-definition and durable design patterns. In some embodiments, the methods provided herein comprise designing the design patterns by a computer; printing high-definition design patterns by transfer printing on a surface of a top layer or a bottom layer or on a laminate; and injection molding a top layer and a bottom layer to sandwich the core layer in between. Such methods are fast, convenient, inexpensive, and suitable for small scale production. In some embodiments, the printed core layer or patterned layer or patterned core layer is in the shape of the eyeglass frame or parts of the eyeglass frame such as frame fronts and temples. In further embodiments, the printed core layer having the desirable shape is prepared by printing a design pattern on a laminate to form a patterned laminate and then by cutting the patterned laminate to form the printed core layer having the desirable shape.

In one aspect, provided herein are methods of making an eyeglass frame comprising a frame front and/or a pair of temples, wherein each of the frame front and temples independently comprises a top layer and a patterned layer having the shape of a frame front and/or a pair of temples, and wherein the patterned layer comprises a laminate and a design pattern on a surface of the laminate, the method comprising the steps of:

a) providing a mold having a cavity, wherein the shape of the cavity corresponds to the shape of the frame front and/or the temples;

b) setting the patterned layer for the frame front and/or the temples in the mold; and c) injecting a melt of a first polymer composition into the cavity to form the top layer.

In some embodiments, the design pattern is in or near the interface of the top layer and the patterned layer. In certain embodiments, at least one of the frame front and temples further comprises a bottom layer, wherein the patterned layer is between the top layer and the bottom layer, and wherein the bottom layer was formed by injecting a melt of a second polymer composition into the cavity after or at the same time as the top layer is formed. In some embodiments, the design pattern is designed with a computer. In certain embodiments, the design pattern is printed on the surface of the laminate by transfer printing. In further embodiments, the transfer printing is heat press transfer printing, thermal transfer printing, dye diffusion thermal transfer printing, dye sublimation transfer printing, water transfer printing or vapor transfer printing. In other embodiments, the transfer printing is heat press transfer printing.

In certain embodiments, the design pattern is transferred onto the laminate from a transfer sheet having a mirror image of the design pattern. In some embodiments, the mirror image of the design pattern is printed on the transfer sheet by using a printer with sublimation inks. In certain embodiments, the transfer temperature is from about 150° C. to about 200° C. In some embodiments, the transfer time is from about 30 seconds to about 200 seconds.

In some embodiments, the patterned layer further comprises one or more particles, one or more three dimensional articles, one or more fluids or a combination thereof. In certain embodiments, the three dimensional articles comprise dry flowers, dry leaves, precious gems or stones, artificial gemstones, metallic ornaments, metallic foils, metallic logos, metallic design patterns, plastic ornaments, plastic foils, plastic logos, plastic design patterns or a combination thereof. In some embodiments, the one or more particles, one or more three dimensional articles or a combination thereof are positioned with an adhesive on one or more surfaces of the patterned layer, the top layer or a combination thereof. In certain embodiments, the one or more particles, one or more three dimensional articles or a combination thereof are positioned in one or more indentations on one or more surfaces of the patterned layer, the top layer or a combination thereof. In some embodiments, the one or more particles, one or more three dimensional articles or a combination thereof are bonded to the one or more indentations by an adhesive.

In certain embodiments, each of the laminate, the first polymer composition and the second polymer composition independently comprises polymer which is cellulose ester, a polycarbonate, a polyurethane, a thermoplastic elastomer (TPE), a polyamide or nylon, a polyester, a copolyester or a combination thereof. In some embodiments, the polymer is cellulose acetate, cellulose acetate propionate, a polycarbonate, a polyamide, a polyester, a copolyester or a combination thereof.

In some embodiments, the first polymer composition and the second polymer composition are the same chemically. In other embodiments, the first polymer composition and the second polymer composition are different chemically.

In some embodiments, the method further comprises the step of coating the patterned layer with a lamination agent before the injecting step. In certain embodiments, the lamination agent comprises an alkyl citrate such as triethyl citrate. In further embodiments, the lamination agent comprises triethyl citrate and cyclohexanone.

In certain embodiments, an injection molding machine is used for the injecting step. In some embodiments, the mold pressure is from about 30 MPa to about 110 MPa. In other embodiments, the mold temperature is from about 45° C. to about 80° C.

In some embodiments, the eyeglass frame comprises a frame front connected to a pair of temples with a pair of hinges. In certain embodiments, the eyeglass frame comprises a pair of temples integrally bonded to a frame front. In other embodiments, the eyeglass frame is a rimless frame comprising a pair of temples without a frame front.

In certain embodiments, the patterned layer is formed by transferring the design pattern from a transfer sheet to a laminate having the shape of the frame front and/or the temples. In some embodiments, the patterned layer is formed by transferring the design pattern from a transfer sheet to a laminate to form a patterned laminate and then by converting the patterned laminate into the patterned layer.

DETAILED DESCRIPTION OF THE INVENTION

Figure 1:
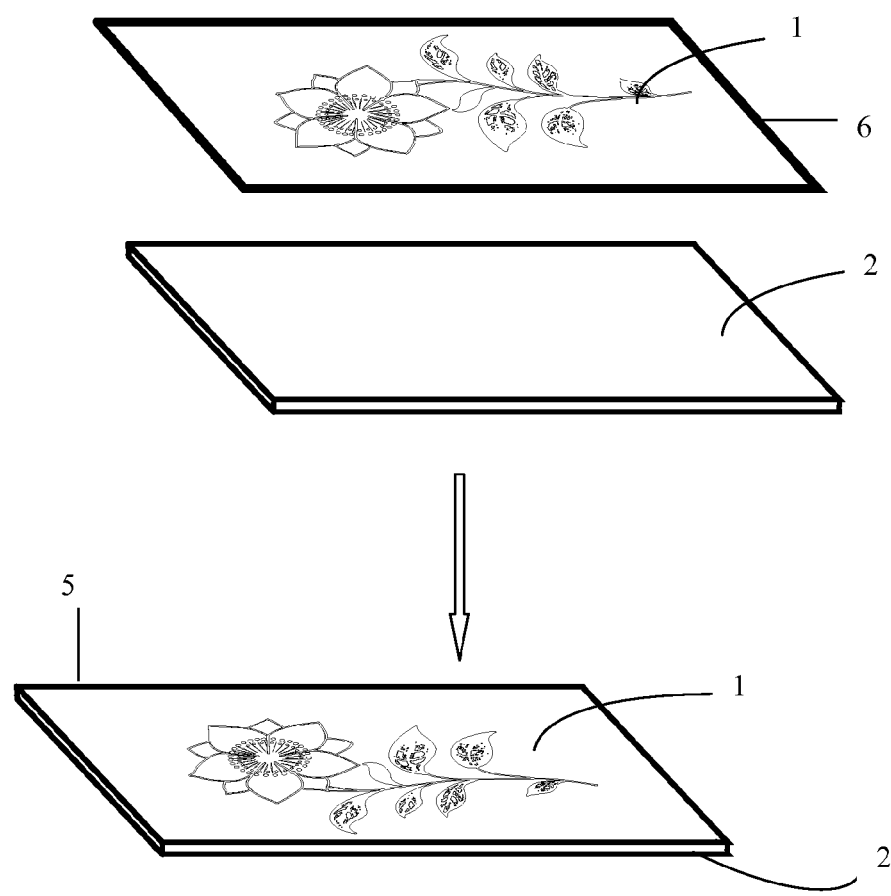
FIG. 1 depicts a process of forming a patterned laminate (5) having a design pattern (1) by transferring the design pattern (1) from a transfer sheet (6) to a laminate (2).

Provided herein are methods of making an eyeglass frame comprising a frame front and/or a pair of temples, wherein each of the frame front and temples independently comprises a top layer and a patterned layer having the shape of a frame front and/or a pair of temples, and wherein the patterned layer comprises a laminate and a design pattern on a surface of the laminate, the method comprising the steps of:

a) providing a mold having a cavity, wherein the shape of the cavity corresponds to the shape of the frame front and/or the temples;

b) setting the patterned layer for the frame front and/or the temples in the mold; and c) injecting a melt of a first polymer composition into the cavity to form the top layer.

In some embodiments, the patterned layer comprises one laminate with a design pattern on a surface of the laminate. In some embodiments, the patterned layer comprises a plurality of laminates. In some embodiments, the patterned layer comprises 2, 3, 4, 5, 6, 7, 8, 9 or 10 laminates having one or more design patterns. The one or more design patterns can be on the surface and/or between any two adjacent laminates. The plurality of laminates may be the same or different physically, chemically, mechanically or dimensionally. In some embodiments, the one or more design patterns may be the same or different in design, color, shade or dimension.

In some embodiments, the design pattern is in or near the interface of the top layer and the patterned layer. In other embodiments, the top layer is transparent. In further embodiments, the laminate is transparent. In certain embodiments, the top layer is transparent and the laminate of the patterned layer is opaque. In other embodiments, the laminate is transparent and the top layer is opaque.

In certain embodiments, at least one of the frame front and temples further comprises a bottom layer, wherein the patterned layer is between the top layer and the bottom layer, and wherein the bottom layer was formed by injecting a melt of a second polymer composition into the cavity after or at the same time as the top layer is formed. In some embodiments, the top layer is transparent and the bottom layer is opaque. In certain embodiments, both the top layer and the bottom layer are transparent. In other embodiments, the laminate of the patterned layer and the bottom layer are transparent and the top layer is opaque. In further embodiments, the laminate of the patterned layer, the bottom layer and the top layer are transparent.

In some embodiments, the first polymer composition in the top layer and the second polymer composition in the bottom layer are the same chemically. In other embodiments, the first polymer composition and the second polymer composition are different chemically. In certain embodiments, the first polymer composition and the laminate in the patterned layer are the same chemically. In other embodiments, the first polymer composition and the laminate are different chemically. In some embodiments, the laminate, the first polymer composition and the second polymer composition are the same chemically. In other embodiments, at least two of the laminate, the first polymer composition and the second polymer composition are different chemically. In further embodiments, all of the laminate, the first polymer composition and the second polymer composition are different chemically.

In certain embodiments, the patterned layer comprising a laminate and a design pattern is formed by transferring the design pattern from a transfer sheet to the laminate having the shape of the frame front and/or the temples. In some embodiments, the patterned layer is formed by transferring the design pattern from a transfer sheet to a laminate in the form of a panel or sheet to form a patterned laminate and then by converting the patterned laminate into the patterned layer having the shape of the frame front and/or the temples.

In some embodiments, the design pattern is designed with a computer. In other embodiments, the design pattern is obtained by copying or altering or modifying an existing image by using a computer. In certain embodiments, the design pattern is printed on a surface of the laminate of the patterned layer by transfer printing. In some embodiments, the transfer printing is heat press transfer printing, thermal transfer printing, dye diffusion thermal transfer printing, dye sublimation transfer printing, water transfer printing, vapor transfer printing or a combination thereof.

In certain embodiments, the transfer printing is heat press transfer printing. In general, heat press transfer printing involves forming a mirror image of the desired design or graphic pattern on a transfer sheet using one or more thermally transferable dyes. The mirror image on the transfer sheet is then thermally transferred to a surface of a laminate by bringing the mirror image into contact with the laminate surface and applying heat and/or pressure. The mirror image may be transferred before or after the laminate is converted to the shape of the frame front, or the temples, or the frame front and the temples. The laminate may comprise a cellulose ester, such as cellulose acetate and cellulose acetate propionate, or a polymer or a polymer composition disclosed herein.

In some embodiment, the transfer printing process conditions are selected such that the conditions do not cause deformation or distortion of the patterned layer or the laminate or the design pattern. In certain embodiment, the transfer printing process conditions are selected such that the conditions cause deformation or distortion of the patterned layer or the laminate or the design pattern.

In certain embodiments, the design pattern is transferred onto the laminate from a transfer sheet having the mirror image of the design pattern by heat press transfer printing. In some embodiments, the heat press transfer temperature is from about 100° C. to about 300° C., from about 110° C. to about 280° C., from about 120° C. to about 260° C., from about 130° C. to about 240° C., from about 150° C. to about 200° C., from about 100° C. to about 200° C., or from about 150° C. to about 250° C. In other embodiments, the heat press transfer temperature is from about 150° C. to about 200° C.

In some embodiments, the heat press transfer time is from about 5 seconds to about 1000 seconds, from about 10 seconds to about 750 seconds, from about 20 seconds to about 500 seconds, from about 25 seconds to about 400 seconds, from about 30 seconds to about 300 seconds, from about 30 seconds to about 200 seconds, from about 30 seconds to about 150 seconds, or from about 30 seconds to about 100 seconds. In certain embodiments, the heat press transfer time is from about 30 seconds to about 200 seconds. In some embodiments, the heat press transfer temperature is from about 150° C. to about 200° C. and the heat press transfer time is from about 30 seconds to about 200 seconds.

A heat press may be used to transfer the design pattern from the transfer sheet on the laminate with the application of heat and pressure for a preset period of time. Any heat press that is designed for heat press transfer printing can be used herein. The heat presses can be manual, semi-automatic or automatic, preferably with digital technology for precisely controlling heat and pressure levels and timing. The heat press may employ a flat platen to apply heat and pressure to the laminate. They may have the "clamshell" design where the upper heat element in the press opens like a clamshell, or the "swing-away" design where the heat platen swings away from the lower platen, or the "draw style press" which allows for the bottom platen to be pulled out like a drawer away from the heat for preparation of the design pattern.

In some embodiments, the design pattern is first printed on a transfer sheet by using a printer with sublimation inks or dyes and then the design pattern is transferred onto a laminate. The humidity during the printing process is from about 45% to about 80%. In certain embodiments, the humidity is from about 20% to about 95%, from about 30% to about 90%, from about 40% to about 85%, or from about 50% to about 75%.

In some embodiments, the transfer printing is thermal transfer printing. In general, thermal transfer printing comprises printing from at least one colored ribbon and transferring a dye or pigmented resin onto a surface of the laminate to form the design image. The ribbon generally travels through the print path on top of the laminate. As the ribbon passes under the print head, the heat melts the dye or pigmented resin from the ribbon and transfers it onto a surface of the laminate. In some embodiment, the ribbon is a pigmented wax ribbon or a pigmented resin ribbon. The design image may be transferred before or after the laminate is converted to a shape corresponding to the shape of the core layer for the frame front, or the temples, or the frame front and the temples.

A thermal transfer printer may be used to transfer the design pattern from the ribbon onto the laminate surface. Any thermal transfer printer that is designed for thermal transfer printing can be used herein. The thermal transfer printer generally has a print-head containing many small resistive heating pins that on contact melt the dye, pigmented wax or pigmented resin onto the laminate surface.

In certain embodiments, the transfer printing is dye diffusion thermal transfer printing. In general, dye diffusion thermal transfer printing is a transfer process which uses a set of ribbons that are coated with heat-sensitive sublimation dyes that are transferred to a laminate with polymer-coated surfaces by the application of heat and pressure. Sublimation refers to the process of a solid substance changing directly into gas or vapor without passing through the intermediary liquid state. Using a conventional heat press, each dye may be activated by heat and pressure and changed into a gas which migrates to the polymer-coated surface. At the same time, the molecular chain of the polymer-coated surface expands and forms openings which can receive dye molecules to form a design pattern. The design pattern is protected within the surface and therefore, is generally scratch resistant.

In some embodiments, the transfer printing is dye sublimation transfer printing. In general, dye sublimation transfer printing includes (1) printing of design patterns on one side of the transfer sheet with sublimation dyes; and (2) transferring the design patterns to the laminate by sublimation of the dyes under heat and pressure. Ink jet printer or thermal transfer printer with sublimation dyes can be used to print the design patterns on a transfer sheet. The sublimation dyes can be water-based or solvent-based sublimation dyes. The transfer sheet can be a sheet of paper which can be easily printed with sublimation dyes, or a sheet of film such as a sheet of polyester with surface modification. Plane pressurized transfer machine, vacuum pressurized transfer machine, rotary transfer machine or other machine designed for the dye sublimation transfer printing can be used to transfer the design patterns from the transfer sheet to a surface such as a surface of a laminate of the patterned layer, the top layer or the bottom layer.

In some embodiments, the transfer printing is water transfer printing. In general, water transfer printing (aka hydrographics, immersion printing, dip transfer printing, water transfer imaging or cubic printing) includes printing a mirror image of the design pattern with solvent based ink on a water soluble polymer film such as a polyvinyl alcohol film; floating the printed water soluble film on water to dissolve the water soluble film; liquefying the solvent based ink image floating on the water with a solvent activator; and submerging the laminate in the water against the liquefied solvent based ink image to transfer the liquefied solvent based image to the surface of the laminate. In some embodiments, the laminate to be printed may be pre-treated and a base coat material may be applied. After removing the laminate from water, the laminate may be washed and dried. In certain embodiments, a transparent top coat or a lacquer may be applied to protect the design pattern.

In certain embodiments, the transfer printing is vapor transfer printing. In general, a mirror image of the desired design pattern is printed on a vapor transfer print sublimation paper. The vapor transfer print sublimation paper may be placed against a surface of the laminate with the mirror image layer facing the surface. A heat press may be used to heat the mirror image layer and transfer the design pattern from the vapor transfer print sublimation paper onto laminate surface.

In some embodiments, the patterned layer further comprises one or more particles, one or more three dimensional articles, one or more fluids or a combination thereof. In certain embodiments, the one or more particles, one or more three dimensional articles or a combination thereof are positioned with an adhesive on one or more surfaces of the patterned layer, the top layer or a combination thereof. In some embodiments, the one or more particles, one or more three dimensional articles or a combination thereof are positioned in one or more indentations on one or more surfaces of the patterned layer, the top layer, the bottom layer, or a combination thereof. In certain embodiments, the one or more particles, one or more three dimensional articles or a combination thereof are bonded to the one or more indentations by an adhesive. In other embodiments, the one or more particles, one or more three dimensional articles or a combination thereof are positioned on one or more surfaces of the patterned layer, the top layer, the bottom layer, or a combination thereof with other techniques known to a skilled artisan.

Some non-limiting examples of the three dimensional articles include dry flowers, dry leaves, precious gems or stones, artificial gemstones, metallic ornaments, metallic foils, metallic logos, metallic design patterns, plastic ornaments, plastic foils, plastic logos, plastic design patterns or a combination thereof.

Some non-limiting examples of suitable precious gems or stones include diamond, ruby, sapphire, pearl, opal, beryls such as emerald (green), aquamarine (blue), red beryl (red), goshenite (colorless), heliodor (yellow), and morganite (pink), peridot, cat's eye, andalusite, axinite, cassiterite, clinohumite, amber, turquoise, hematite, chrysocolla, tiger's eye, quartz, tourmaline, carnelian, pyrite, sugilite, malachite, rose quartz, snowflake obsidian, ruby, moss agate, amethyst, blue lace agate, lapis lazuli and the like.

Any suitable metal or metal alloy known for making fashion ornaments can be used herein for the metallic ornaments, foils, logos, or design patterns disclosed herein. Some non-limiting examples of suitable metals include gold, silver, platinum, zinc, copper, tin, lead, aluminum, titanium, molybdenum, vanadium, tungsten or a combination thereof. Some non-limiting examples of suitable metal alloys include alloys of at least two of the metals selected from zinc, copper, tin, lead, aluminum, titanium, molybdenum, vanadium, and tungsten. In some embodiments, the metal alloys are selected from alloys of copper and zinc, aluminum alloys, tungsten alloys, cobalt-copper alloys and combinations thereof.

In some embodiments, the patterned layer further comprises or encloses one or more clear or colored fluids. In some embodiments, the patterned layer further comprises one or more cavities fully or partially filling with one or more clear or colored fluids. In some embodiments, the clear or colored fluids are immiscible with each other. Some non-limiting examples of suitable fluids include colored water, clear water, colored oil-based fluid, clear oil-based fluid, colored liquid silicone, clear liquid silicone or a combination thereof.

In some embodiments, the method further comprises the step of coating the patterned layer with a lamination agent before the injecting step. Optionally, the polymer compositions disclosed herein can comprise a lamination agent. Any lamination agent that can promote the adhesion between the core layer and the layer(s) formed by injection molding. Non-limiting examples of lamination agents include alkyl citrates, alkyl sulphonic acid phenyl esters, 1,2-cyclohexane dicarboxylic acid diisononyl esters and combinations thereof. Non-limiting examples of alkyl citrates include triethyl citrate (TEC), acetyl triethyl citrate (ATEC), tributyl citrate (TBC), acetyl tributyl citrate (ATBC), trioctyl citrate (TOC), acetyl trioctyl citrate (ATOC), trihexyl citrate (THC), acetyl trihexyl citrate (ATHC), butyryl trihexyl citrate (BTHC), trimethyl citrate (TMC), acetyl trimethyl citrate (ATMC) and combinations thereof. In some embodiments, the lamination agent comprises an alkyl citrate. In certain embodiments, the lamination agent comprises triethyl citrate. In some embodiments, the lamination agent comprises an alkyl citrate and an organic solvent. In certain embodiments, the lamination agent comprises triethyl citrate and cylcohexanone.

In some embodiments, the polymer composition comprises at least one polyamide or nylon. Any polyamide or nylon suitable for making eyeglass frames can be used herein. Some non-limiting examples of suitable polyamide or nylon include polyamide 6, polyamide 8, polyamide 10, polyamide 11 and polyamide 12.

In certain embodiments, the polymer composition comprises at least one polyester. Any polyester suitable for making eyeglass frames can be used herein. Some non-limiting examples of suitable polyester include polyethylene terephthalate (PET), polyethylene naphthalate (PEN) and poly(cyclohexanedimethylene terephthalate) (PCT).

In some embodiments, the polymer composition comprises at least one copolyester. Any copolyester suitable for making eyeglass frames can be used herein. Some non-limiting examples of suitable copolyester include PCTA or a glycol modified copolyester such as copolyesters derived from ethylene glycol, 1,4-cyclohexane dimethanol and dimethyl terephthalate or terephthalic acid (e.g., PCTG, PETG or PET-CHDM).

In certain embodiments, the polymer composition comprises a PCTG polymer which can be derived from ethylene glycol, 1,4-cyclohexane dimethanol and dimethyl terephthalate or terephthalic acid (TPA). The generic structure of PCTG can be represented by formula (I) as shown below.

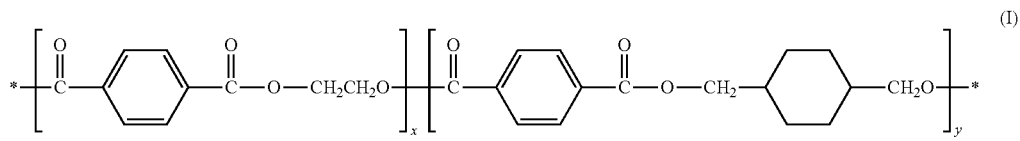

Polymer Compositions

As used herein, the term "polymer" refers to a polymeric compound prepared by polymerizing monomers, whether of the same or a different type. The generic term "polymer" embraces the terms "homopolymer," "copolymer," "terpolymer" as well as "interpolymer."

Each of the laminate in the patterned layer, the first polymer composition in the top layer and the second polymer composition in the bottom layer independently comprises a polymer or polymer composition disclosed herein.

The polymer composition can comprise any polymer suitable for making eyeglass frames. Some non-limiting examples of suitable polymers include cellulose esters, polycarbonates, polyurethanes, thermoplastic elastomers (TPE), polyamides or nylons, polyesters, copolyesters and combinations thereof. In some embodiments, the polymer is or comprises cellulose acetate, cellulose acetate propionate, a polycarbonate, a polyamide, a polyester, a copolyester or a combination thereof.

In some embodiments, the polymer or polymer composition comprises at least one cellulose ester. Any cellulose ester suitable for making eyeglass frames can be used herein. Some non-limiting examples of suitable cellulose ester include cellulose acetate and cellulose acetate propionate.

In certain embodiments, the polymer composition comprises at least one thermoplastic elastomer (TPE). Any TPE that can be repeatedly stretched without permanently deformation or distortion can be used herein. Some non-limiting examples of suitable thermoplastic elastomer include styrenic block copolymers, thermoplastic polyolefin blends (TPOs), elastomeric alloys, thermoplastic polyurethanes (TPUs), thermoplastic copolyesters, and thermoplastic polyamides.

wherein the asterisks (*) are end groups (e.g., H, OH, SH, TPA, ester or amide end group); y is from 0.5 to 0.99; and x is from 0.5 to 0.01. PCTG is distinguished from PETG or PCT by the values of x and y. For example, y is from 0.05 to 0.5 and x is from 0.95 to 0.5 for PETG; y is 1.0 and x is 0 for PCT; and y is from 0.01 to 0.05 and x is from 0.99 to 0.95 for PET-CHDM.

Any PCTG that has the above generic formula (I) can be used herein. In some embodiments, y of the PCTG polymers used herein is from 0.5 to 0.99 and x is from 0.5 to 0.01. In other embodiments, y of the PCTG polymers used herein is from 0.55 to 0.95 and x is from 0.45 to 0.05. In further embodiments, y of the PCTG polymers used herein is from 0.6 to 0.9 and x is from 0.4 to 0.1. In still further embodiments, y of the PCTG polymers used herein is from 0.65 to 0.85 and x is from 0.35 to 0.15. In still further embodiments, the sum of x and y is 1.

The end groups of formula (I) can be varied according to the requirements of the eyeglass frames. In some embodiments, the end groups are H, OH, TPA or a mixture thereof. In other embodiments, the OH end group can be modified by reacting with an carboxylic acid to form an ester end group. In further embodiments, the TPA end group can be modified by reacting with an alcohol or an amine to form an ester end group or an amide end group. A skilled artisan can recognize that the above-mentioned end group can be modified by any reaction or chemistry known in the literature.

The polymers disclosed herein can have a melt index, $I_2$, from about 0.01 to about 2000 g/10 minutes, from about 0.01 to about 1000 g/10 minutes, from about 0.01 to about 500 g/10 minutes, or from about 0.01 to about 100 g/10 minutes.

The melt index can be measured at a condition of 190° C./2.16 kg according to ASTM D-1238, which is incorporated herein by reference.

The polymers disclosed herein can have a molecular weight, $M_w$, from about 1,000 g/mole to about 5,000,000 g/mole, from about 1000 g/mole to about 1,000,000, from about 10,000 g/mole to about 500,000 g/mole, or from about 10,000 g/mole to about 300,000 g/mole. The density of the polymers disclosed herein can be from about 1.0 to about 1.4 g/cm$^3$ or from about 1.1 g/cm$^3$ to about 1.3 g/cm$^3$.

The amount of the polymer in the polymer composition can vary from about 60 wt. % to about 100 wt. %, from about 70 wt. % to about 99.9 wt. %, from about 80 wt. % to about 99.5 wt. %, from about 90 wt. % to about 99 wt. %, or from about 95 wt. % to about 99 wt. %, based on the total amount of the polymer composition.

In some embodiments, the polymer compositions for making the eyeglass frames have thermo-memory property. Thermo-memory property refers to the original shape of the eyeglass frame can be adjusted to another shape at a certain temperature (e.g., a temperature higher than the glass transition temperature (i.e., $T_g$) of the polymer composition), and the adjusted eyeglass frame maintains the adjusted shape after cooling down to room temperature. When the frame is heated up again, it can return to the original shape. Having this desirable property, the eyeglass frame can be easily adjusted during the fitting process to suit the different needs of various wearers. In certain embodiments, the Tg of the polymer composition is from about 40° C. to about 140° C., from about 45° C. to about 120° C., from about 50° C. to about 110° C., from about 55° C. to about 100° C., from about 60° C. to about 90° C., from about 65° C. to about 85° C. In further embodiments, the $T_g$ of the polymer composition is from about 70° C. to about 80° C.

In certain embodiments, the polymer compositions for making the eyeglass frames are dimensionally stable. The dimension of the eyeglass frames can stably be kept even though the frame has been produced or used for a long period of time.

In other embodiments, the polymer compositions for making the eyeglass frames have good thermal stability and toughness. The shape and dimensional stability of the eyeglass frames can be kept even though the eyeglass frames are subjected to a temperature higher than about 60° C. or higher than about 70° C. for more than about 2 days or more than about 7 days.

Additives

Optionally, the polymer compositions disclosed herein can comprise at least one additive for the purposes of improving and/or controlling the processibility, appearance, physical, chemical, and/or mechanical properties of the polymer compositions. In some embodiments, the polymer compositions do not comprise an additive. Any plastics additive known to a person of ordinary skill in the art may be used in the polymer compositions disclosed herein. Non-limiting examples of suitable additives include colorants or pigments, UV stabilizers, plasticizers, antioxidants, fillers, lubricants, antifogging agents, flow aids, coupling agents, cross-linking agents, nucleating agents, surfactants, slip agents, anti-blocking agents, solvents, flame retardants, antistatic agents, and combinations thereof. The total amount of the additives can range from about greater than 0 to about 80 wt. %, from about 0.001 wt. % to about 70 wt. %, from about 0.01 wt. % to about 60 wt. %, from about 0.1 wt. % to about 50 wt. %, from about 1 wt. % to about 40 wt. %, or from about 10 wt. % to about 50 wt. % of the total weight of the polymer composition. Some polymer additives have been described in Zweifel Hans et al., "*Plastics Additives Handbook*," Hanser Gardner Publications, Cincinnati, Ohio, 5th edition (2001), which is incorporated herein by reference in its entirety.

In further embodiments, the polymer compositions disclosed herein optionally comprise a colorant or pigment that can change the look of the polymer compositions to human eyes. Any colorant or pigment known to a person of ordinary skill in the art may be added to the polymer compositions disclosed herein. Non-limiting examples of suitable colorants or pigments include inorganic pigments such as metal oxides such as iron oxide, zinc oxide, and titanium dioxide, mixed metal oxides, carbon black, organic pigments such as anthraquinones, anthanthrones, azo and monoazo compounds, arylamides, benzimidazolones, BONA lakes, diketopyrrolo-pyrroles, dioxazines, disazo compounds, diarylide compounds, flavanthrones, indanthrones, isoindolinones, isoindolines, metal complexes, monoazo salts, naphthols, b-naphthols, naphthol AS, naphthol lakes, perylenes, perinones, phthalocyanines, pyranthrones, quinacridones, and quinophthalones, and combinations thereof. Where used, the amount of the colorant or pigment in the polymer composition can be from about greater than 0 to about 10 wt %, from about 0.1 to about 5 wt %, or from about 0.25 to about 2 wt % of the total weight of the polymer composition. Some colorants have been described in Zweifel Hans et al., "*Plastics Additives Handbook*," Hanser Gardner Publications, Cincinnati, Ohio, 5th edition, Chapter 15, pages 813-882 (2001), which is incorporated herein by reference.

Optionally, the polymer compositions disclosed herein can comprise a filler which can be used to adjust, inter alia, volume, weight, costs, and/or technical performance. Any filler known to a person of ordinary skill in the art may be added to the polymer compositions disclosed herein. Non-limiting examples of suitable fillers include talc, calcium carbonate, chalk, calcium sulfate, clay, kaolin, silica, glass, fumed silica, mica, wollastonite, feldspar, aluminum silicate, calcium silicate, alumina, hydrated alumina such as alumina trihydrate, glass microsphere, ceramic microsphere, thermoplastic microsphere, barite, wood flour, glass fibers, carbon fibers, marble dust, cement dust, magnesium oxide, magnesium hydroxide, antimony oxide, zinc oxide, barium sulfate, titanium dioxide, titanates and combinations thereof. In some embodiments, the filler is barium sulfate, talc, calcium carbonate, silica, glass, glass fiber, alumina, titanium dioxide, or a mixture thereof. In other embodiments, the filler is talc, calcium carbonate, barium sulfate, glass fiber or a mixture thereof. Where used, the amount of the filler in the polymer composition can be from about greater than 0 to about 80 wt %, from about 0.1 to about 60 wt %, from about 0.5 to about 40 wt %, from about 1 to about 30 wt %, or from about 10 to about 40 wt % of the total weight of the polymer composition. Some fillers have been disclosed in U.S. Pat. No. 6,103,803 and Zweifel Hans et al., "*Plastics Additives Handbook*," Hanser Gardner Publications, Cincinnati, Ohio, 5th edition, Chapter 17, pages 901-948 (2001), both of which are incorporated herein by reference.

In other embodiments, the polymer compositions disclosed herein optionally comprise an UV stabilizer that may prevent or reduce the degradation of the polymer compositions by UV radiations. Any UV stabilizer known to a person of ordinary skill in the art may be added to the polymer compositions disclosed herein. Non-limiting examples of suitable UV stabilizers include benzophenones, benzotriazoles, aryl esters, oxanilides, acrylic esters, formamidines, carbon black, hindered amines, nickel quenchers, hindered amines, phenolic antioxidants, metallic salts, zinc compounds and combinations thereof. Where used, the amount of the UV stabilizer in the polymer composition can be from about greater than 0 to about 5 wt %, from about 0.01 to about 3 wt %, from about 0.1 to about 2 wt %, or from about 0.1 to about 1 wt % of the total weight of the polymer composition. Some UV stabilizers have been described in Zweifel Hans et al., "*Plastics Additives Handbook*," Hanser Gardner Publications, Cincinnati, Ohio, 5th edition, Chapter 2, pages 141-426 (2001), which is incorporated herein by reference.

Optionally, the polymer compositions disclosed herein can comprise a plasticizer. In general, a plasticizer is a chemical that can increase the flexibility and lower the glass transition temperature of polymers. Any plasticizer disclosed herein can used for the polymer compositions. Non-limiting examples of plasticizers include mineral oils, abietates, adipates, alkyl sulfonates, azelates, benzoates, chlorinated paraffins, citrates, epoxides, glycol ethers and their esters, glutarates, hydrocarbon oils, isobutyrates, oleates, pentaerythritol derivatives, phosphates, phthalates, esters, polybutenes, ricinoleates, sebacates, sulfonamides, tri- and pyromellitates, biphenyl derivatives, stearates, difuran diesters, fluorine-containing plasticizers, hydroxybenzoic acid esters, isocyanate adducts, multi-ring aromatic compounds, natural product derivatives, nitriles, siloxane-based lamination agents, tar-based products, thioeters and combinations thereof. Where used, the amount of the plasticizer in the polymer composition can be from greater than 0 to about 15 wt %, from about 0.5 to about 10 wt %, or from about 1 to about 5 wt % of the total weight of the polymer composition. Some plasticizers have been described in George Wypych, "*Handbook of Plasticizers*," ChemTec Publishing, Toronto-Scarborough, Ontario (2004), which is incorporated herein by reference.

In some embodiments, the polymer compositions disclosed herein optionally comprise an antioxidant that can prevent the oxidation of polymer components and organic additives in the polymer compositions. Any antioxidant known to a person of ordinary skill in the art may be added to the polymer compositions disclosed herein. Non-limiting examples of suitable antioxidants include aromatic or hindered amines such as alkyl diphenylamines, phenyl-α-naphthylamine, alkyl or aralkyl substituted phenyl-α-naphthylamine, alkylated p-phenylene diamines, tetramethyldiaminodiphenylamine and the like; phenols such as 2,6-di-t-butyl-4-methylphenol; 1,3,5-trimethyl-2,4,6-tris(3',5'-di-t-butyl-4'-hydroxybenzyl)benzene; tetrakis[(methylene(3,5-di-t-butyl-4-hydroxyhydrocinnamate)]methane (e.g., IRGANOX™ 1010, from Ciba Geigy, N.Y.); acryloyl modified phenols; octadecyl-3,5-di-t-butyl-4-hydroxycinnamate (e.g., IRGANOX™ 1076, commercially available from Ciba Geigy); phosphites and phosphonites; hydroxylamines; benzofuranone derivatives; and combinations thereof. Where used, the amount of the antioxidant in the polymer composition can be from about greater than 0 to about 5 wt %, from about 0.0001 to about 2.5 wt %, from about 0.001 to about 1 wt %, or from about 0.001 to about 0.5 wt % of the total weight of the polymer composition. Some antioxidants have been described in Zweifel Hans et al., "*Plastics Additives Handbook*," Hanser Gardner Publications, Cincinnati, Ohio, 5th edition, Chapter 1, pages 1-140 (2001), which is incorporated herein by reference.

Optionally, the polymer compositions disclosed herein can comprise a lubricant. In general, the lubricant can be used, inter alia, to modify the rheology of the molten polymer compositions, to improve the surface finish of molded articles, and/or to facilitate the dispersion of fillers or pigments. Any lubricant known to a person of ordinary skill in the art may be added to the polymer compositions disclosed herein. Non-limiting examples of suitable lubricants include fatty alcohols and their dicarboxylic acid esters, fatty acid esters of short-chain alcohols, fatty acids, fatty acid amides, metal soaps, oligomeric fatty acid esters, fatty acid esters of long-chain alcohols, montan waxes, polyethylene waxes, polypropylene waxes, natural and synthetic paraffin waxes, fluoropolymers and combinations thereof. Where used, the amount of the lubricant in the polymer composition can be from about greater than 0 to about 5 wt %, from about 0.1 to about 4 wt %, or from about 0.1 to about 3 wt % of the total weight of the polymer composition. Some suitable lubricants have been disclosed in Zweifel Hans et al., "*Plastics Additives Handbook*," Hanser Gardner Publications, Cincinnati, Ohio, 5th edition, Chapter 5, pages 511-552 (2001), both of which are incorporated herein by reference.

Optionally, the polymer compositions disclosed herein can comprise an antistatic agent. Generally, the antistatic agent can increase the conductivity of the polymer compositions and to prevent static charge accumulation. Any antistatic agent known to a person of ordinary skill in the art may be added to the polymer compositions disclosed herein. Non-limiting examples of suitable antistatic agents include conductive fillers (e.g., carbon black, metal particles and other conductive particles), fatty acid esters (e.g., glycerol monostearate), ethoxylated alkylamines, diethanolamides, ethoxylated alcohols, alkylsulfonates, alkylphosphates, quaternary ammonium salts, alkylbetaines and combinations thereof. Where used, the amount of the antistatic agent in the polymer composition can be from about greater than 0 to about 5 wt %, from about 0.01 to about 3 wt %, or from about 0.1 to about 2 wt % of the total weight of the polymer composition. Some suitable antistatic agents have been disclosed in Zweifel Hans et al., "*Plastics Additives Handbook*," Hanser Gardner Publications, Cincinnati, Ohio, 5th edition, Chapter 10, pages 627-646 (2001), both of which are incorporated herein by reference.

In some embodiments, the polymer compositions disclosed herein comprise a slip agent. In other embodiments, the polymer compositions disclosed herein do not comprise a slip agent. Slip is the sliding of film surfaces over each other or over some other substrates. The slip performance of films can be measured by ASTM D 1894, *Static and Kinetic Coefficients of Friction of Plastic Film and Sheeting*, which is incorporated herein by reference. In general, the slip agent can convey slip properties by modifying the surface properties of films; and reducing the friction between layers of the films and between the films and other surfaces with which they come into contact.

Any slip agent known to a person of ordinary skill in the art may be added to the polymer compositions disclosed herein. Non-limiting examples of the slip agents include primary amides having about 12 to about 40 carbon atoms (e.g., erucamide, oleamide, stearamide and behenamide); secondary amides having about 18 to about 80 carbon atoms (e.g., stearyl erucamide, behenyl erucamide, methyl erucamide and ethyl erucamide); secondary-bis-amides having about 18 to about 80 carbon atoms (e.g., ethylene-bis-stearamide and ethylene-bis-oleamide); and combinations thereof.

In some embodiments, the slip agent is a primary amide with a saturated aliphatic group having between 18 and about 40 carbon atoms (e.g., stearamide and behenamide). In other embodiments, the slip agent is a primary amide with an unsaturated aliphatic group containing at least one carbon-carbon double bond and between 18 and about 40 carbon atoms (e.g., erucamide and oleamide). In further embodiments, the slip agent is a primary amide having at least 20 carbon atoms. In further embodiments, the slip agent is erucamide, oleamide, stearamide, behenamide, ethylene-bis-stearamide, ethylenebis-oleamide, stearyl erucamide, behenyl erucamide or a combination thereof. In a particular embodiment, the slip agent is erucamide. In further embodiments, the slip agent is commercially available having a trade name such as ATMER™ SA from Uniqema, Everberg, Belgium; ARMOSLIP® from Akzo Nobel Polymer Chemicals, Chicago, Ill.; KEMAMIDE from Witco, Greenwich, Conn.; and CRODAMIDE® from Croda, Edison, N.J. Where used, the amount of the slip agent in the polymer composition can be from about greater than 0 to about 3 wt %, from about 0.0001 to about 2 wt %, from about 0.001 to about 1 wt %, from about 0.001 to about 0.5 wt % or from about 0.05 to about 0.25 wt % of the total weight of the polymer composition. Some slip agents have been described in Zweifel Hans et al., "*Plastics Additives Handbook,*" Hanser Gardner Publications, Cincinnati, Ohio, 5th edition, Chapter 8, pages 601-608 (2001), which is incorporated herein by reference.

Optionally, the polymer compositions disclosed herein can comprise an anti-blocking agent. In some embodiments, the polymer compositions disclosed herein do not comprise an anti-blocking agent. The anti-blocking agent can be used to prevent the undesirable adhesion between touching layers of articles made from the polymer compositions, particularly under moderate pressure and heat during storage, manufacture or use. Any anti-blocking agent known to a person of ordinary skill in the art may be added to the polymer compositions disclosed herein. Non-limiting examples of anti-blocking agents include minerals (e.g., clays, chalk, and calcium carbonate), synthetic silica gel (e.g., SYLOBLOC® from Grace Davison, Columbia, Md.), natural silica (e.g., SUPER FLOSS® from Celite Corporation, Santa Barbara, Calif.), talc (e.g., OPTIBLOC® from Luzenac, Centennial, Colo.), zeolites (e.g., SIPERNAT® from Degussa, Parsippany, N.J.), aluminosilicates (e.g., SILTON® from Mizusawa Industrial Chemicals, Tokyo, Japan), limestone (e.g., CARBOREX® from Omya, Atlanta, Ga.), spherical polymeric particles (e.g., EPOSTAR®, poly(methyl methacrylate) particles from Nippon Shokubai, Tokyo, Japan and TOSPEARL®, silicone particles from GE Silicones, Wilton, Conn.), waxes, amides (e.g. erucamide, oleamide, stearamide, behenamide, ethylene-bis-stearamide, ethylene-bis-oleamide, stearyl erucamide and other slip agents), molecular sieves, and combinations thereof. The mineral particles can lower blocking by creating a physical gap between articles, while the organic anti-blocking agents can migrate to the surface to limit surface adhesion. Where used, the amount of the anti-blocking agent in the polymer composition can be from about greater than 0 to about 3 wt %, from about 0.0001 to about 2 wt %, from about 0.001 to about 1 wt %, or from about 0.001 to about 0.5 wt % of the total weight of the polymer composition. Some anti-blocking agents have been described in Zweifel Hans et al., "*Plastics Additives Handbook,*" Hanser Gardner Publications, Cincinnati, Ohio, 5th edition, Chapter 7, pages 585-600 (2001), which is incorporated herein by reference.

In further embodiments, the polymer compositions disclosed herein optionally comprise a cross-linking agent that can be used to increase the cross-linking density of the polymer compositions. Any cross-linking agent known to a person of ordinary skill in the art may be added to the polymer compositions disclosed herein. Non-limiting examples of suitable cross-linking agents include organic peroxides (e.g., alkyl peroxides, aryl peroxides, peroxyesters, peroxycarbonates, diacylperoxides, peroxyketals, and cyclic peroxides) and silanes (e.g., vinyltrimethoxysilane, vinyltriethoxysilane, vinyltris(2-methoxyethoxy)silane, vinyltriacetoxysilane, vinylmethyldimethoxysilane, and 3-methacryloyloxypropyltrimethoxysilane). Where used, the amount of the cross-linking agent in the polymer composition can be from about greater than 0 to about 20 wt %, from about 0.1 to about 15 wt %, or from about 1 to about 10 wt % of the total weight of the polymer composition. Some suitable cross-linking agents have been disclosed in Zweifel Hans et al., "*Plastics Additives Handbook,*" Hanser Gardner Publications, Cincinnati, Ohio, 5th edition, Chapter 14, pages 725-812 (2001), both of which are incorporated herein by reference.

The cross-linking of the polymer compositions can also be initiated by any radiation means known in the art, including, but not limited to, electron-beam irradiation, beta irradiation, gamma irradiation, corona irradiation, and UV radiation with or without cross-linking catalyst. U.S. patent application Ser. No. 10/086,057 (published as US2002/0132923 A1) and U.S. Pat. No. 6,803,014 disclose electron-beam irradiation methods that can be used in embodiments of the invention.

Crosslinking can be promoted with a crosslinking catalyst, and any catalyst that will provide this function can be used. Suitable catalysts generally include organic bases, carboxylic acids, and organometallic compounds including organic titanates and complexes or carboxylates of lead, cobalt, iron, nickel, zinc and tin. Dibutyltindilaurate, dioctyltinmaleate, dibutyltindiacetate, dibutyltindioctoate, stannous acetate, stannous octoate, lead naphthenate, zinc caprylate, cobalt naphthenate; and the like. Tin carboxylate, especially dibutyltindilaurate and dioctyltinmaleate, are particularly effective for this invention. The catalyst (or mixture of catalysts) is present in a catalytic amount, typically between about 0.015 and about 0.035 phr.

Preparation of the Polymer Compositions

The ingredients of the polymer compositions can be mixed or blended using methods known to a person of ordinary skill in the art, preferably methods that can provide a substantially homogeneous distribution of the polymer and additives in the polymer composition. Non-limiting examples of suitable blending methods include melt blending, solvent blending, extruding, and the like.

In some embodiments, the ingredients of the polymer compositions are melt blended by a method as described by Guerin et al. in U.S. Pat. No. 4,152,189. First, all solvents, if there are any, are removed from the ingredients by heating to an appropriate elevated temperature of about 100° C. to about 200° C. or about 150° C. to about 175° C. at a pressure of about 5 torr (667 Pa) to about 10 torr (1333 Pa). Next, the ingredients are weighed into a vessel in the desired proportions and the polymer composition is formed by heating the contents of the vessel to a molten state while stirring.

In other embodiments, the ingredients of the polymer compositions are processed using solvent blending. First, the ingredients of the desired polymer composition are dissolved in a suitable solvent and the mixture is then mixed or blended. Next, the solvent is removed to provide the polymer composition.

In further embodiments, physical blending devices that provide dispersive mixing, distributive mixing, or a combination of dispersive and distributive mixing can be useful in preparing homogenous blends. Both batch and continuous methods of physical blending can be used. Non-limiting examples of batch methods include those methods using BRABENDER® mixing equipments (e.g., BRABENDER PREP CENTER®, available from C. W. Brabender Instruments, Inc., South Hackensack, N.J.) or BANBURY® internal mixing and roll milling (available from Farrel Company, Ansonia, Conn.) equipment. Non-limiting examples of continuous methods include single screw extruding, twin screw extruding, disk extruding, reciprocating single screw extruding, and pin barrel single screw extruding. In some embodiments, the additives can be added into an extruder through a feed hopper or feed throat during the extrusion of the polymer composition. The mixing or blending of polymers by extrusion has been described in C. Rauwendaal, "*Polymer Extrusion*", Hanser Publishers, New York, N.Y., pages 322-334 (1986), which is incorporated herein by reference.

When one or more additives are required in the polymer compositions, the desired amounts of the additives can be added in one charge or multiple charges to the polymer composition. Furthermore, the addition can take place in any order. In some embodiments, the additives are first added and mixed or blended with the polymer. Polymer compositions can also be performed at the fabrication equipment as dry blends (no pre-compounding required).

Alternatively, master batches containing high concentrations of the additives can be used. In general, master batches can be prepared by blending either the polymer with high concentrations of additives. The master batches can have additive concentrations from about 1 wt. % to about 50 wt. %, from about 1 wt. % to about 40 wt. %, from about 1 wt. % to about 30 wt. %, or from about 1 wt. % to about 20 wt. % of the total weight of the polymer composition. The master batches can then be added to the polymer compositions in an amount determined to provide the desired additive concentrations in the end products. In some embodiments, the master batch contains a UV stabilizer, a colorant or pigment, a filler, a plasticizer, an antioxidant, a slip agent, an anti-blocking agent, a lubricant, an antifogging agent, a flow aid, a coupling agent, a cross-linking agent, a nucleating agent, a surfactant, a solvent, a flame retardant, an antistatic agent, or a combination thereof. In other embodiment, the master batch contains a UV stabilizer, a colorant or pigment, a filler or a combination thereof. In other embodiment, the master batch contains at least one colorant.

Making Eyeglass Frames with Polymers or Polymer Compositions

The polymers or polymer compositions disclosed herein can be used to prepare eyeglass frames by injection molding or other conventional molding techniques. In some embodiments, the method disclosed herein can be used to make an eyeglass frame with a design pattern which can be designed with a computer. The design pattern may be printed by transfer printing on the surface of a laminate. The laminate with the design pattern is then shaped corresponding to the patterned layer or patterned core layer for a frame front and/or a pair of temples of an eyeglass frame. The patterned layer may be set in a mold of an injection molding machine which then injects a polymer melt into the mold so as to form top and bottom layers above and below the patterned layer.

The eyeglass frames may be, inter alia, prescription eyeglass frames, nonprescription eyeglass frames, protective glass frames and the like. The prescription eyeglasses can be used to treat, inter alia, myopia, hyperopia, astigmatism, and presbyopia. The protective glass frames can be used to protected against hazards such as toxic gases, dusts, chemicals, lasers, X-rays, UV light, sunlight or the like. Some non-limiting examples of suitable protective glass frames include sunglass frames, safety glass frames, laser protection eyewear frames and the like. When lenses of the eyeglasses are plano lenses, the frames are referred as nonprescription eyeglasses.

The eyeglass frames can be full-rim frames, semi-rimless frames, rimless frames or any other styles known to skilled artisans.

The lenses of the eyeglasses can be made from or of any conventional lens material known to skilled artisans. For examples, the lenses can be made from or of a variety of glasses or polymers. In some embodiments, the lense material comprises or is a glass. Any glass which is suitable for making lenses can be used as a lense material herein. Some non-limiting examples of suitable glasses include silica-based glasses, germanates (glasses based on $GeO_2$), tellurites (glasses based on $TeO_2$), antimonates (glasses based on $Sb_2O_3$), arsenates (glasses based on $As_2O_3$), titanates (glasses based on $TiO_2$), tantalates (glasses based on $Ta_2O_5$) and combinations thereof. In some embodiments, the lense material is a silica-based glass. Some non-limiting examples of suitable silica-based glasses include crown glass and flint glass.

In some embodiments, the lense material comprises or is a polymer, plastic or resin. Any plastic which is suitable for making lenses can be used as a lense material herein. Some non-limiting examples of suitable plastics include polyalkyl acrylates, polyalkyl methacrylates such as polymethyl methacrylate (e.g., PLEXIGLAS™, LIMACRYL™, R-CAST™, PERSPEX™ PLAZCRYL™ ACRYLEX™ ACRYLITE™, ACRYLPLAST™, ALTUGLAS™, POLYCAST™ and LUCITE™), polycarbonates, resins (e.g., CR39™ or allyl diglycol carbonate), polyurethanes and combinations thereof.

The lenses of the eyeglasses can be coated with one or more coatings such as anti-scratch, anti-UV and anti-reflective coatings. Further, the lenses of some eyeglasses such as sunglasses can be tinted with colors. The color of the lenses can vary by style, fashion, and purpose. In certain embodiments, the color of the lenses can be green, grey, yellow, or brown.

In some embodiments, the lenses of the eyeglasses are coated with an anti-scratch coating. Any anti-scratch coating which is suitable for protecting optical lenses from scratches can be used herein. Some non-limiting examples of suitable anti-scratch coatings include UV cure hardcoats, silicone-based hardcoats and acrylic hardcoats.

In certain embodiments, the lenses of the eyeglasses are coated with an anti-UV coating. Any anti-UV coating or UV protective coating which is suitable for screen out UV light can be used herein. Some non-limiting examples of suitable anti-UV coating methods are tinting, polarizing, grading and mirroring.

In other embodiments, the lenses of the eyeglasses are coated with an anti-reflective coating. Any anti-refractive coating which is suitable for reducing reflection can be used herein. Some non-limiting examples of suitable anti-refractive coatings are low-index silica or natural nanostructured films.

In some embodiments, the lenses are prescription or corrective lenses for modifying the focal length of the eye to alleviate the effects of nearsightedness (myopia), farsightedness (hyperopia) or astigmatism.

In certain embodiments, the eyeglasses are safety glasses made with shatter-resistant plastic lenses to protect the eye from flying debris. The lense may have a minimum thickness of 1 millimeter at the thinnest point, regardless of material. Safety glasses can vary in the level of protection they provide. For example, those used in medicine may be expected to protect against blood splatter while safety glasses in a factory might have stronger lenses and a stronger frame with additional shields at the temples. The lenses of safety glasses can also be shaped for correction.

Some safety glasses are designed to fit over corrective glasses or sunglasses. They may provide less eye protection than goggles or other forms of eye protection, but their light weight increases the likelihood that they will actually be used. Recent safety glasses have tended to be given a more stylish design, in order to encourage their use. The pictured wrap-around safety glasses are evidence of this style change with the close fitting nature of the wraparound dispensing with the need for side shields. Corrective glasses with plastic lenses can be used in the place of safety glasses in many environments; this is one advantage that they have over contact lenses.

There are also safety glasses for welding, which are styled like wraparound sunglasses, but with much darker lenses, for use in welding where a full sized welding helmet is inconvenient or uncomfortable. These are often called "flash goggles", because they provide protection from welding flash.

In certain embodiments, the eyeglasses are sunglasses. Sunglasses may be made with either prescription or non-prescription lenses that are darkened to provide protection against bright visible and possibly ultraviolet light.

Glasses with photosensitive lenses, called photochromic lenses, become darker in the presence of UV light. Unfortunately, many car windshields block the passage of UV light, making photochromic lenses less effective whilst driving on bright days. Still, they offer the convenience of not having to carry both clear glasses and sunglasses to those who frequently go indoors and outdoors during the course of a day.

Light polarization is an added feature that can be applied to sunglass lenses. Polarization filters remove horizontal rays of light, which can cause glare. Popular among fishermen and hunters, polarized sunglasses allow wearers to see into water when normally glare or reflected light would be seen. Polarized sunglasses may present some difficulties for pilots since reflections from water and other structures often used to gauge altitude may be removed, or instrument readings on liquid crystal displays may be blocked.

Yellow lenses are commonly used by golfers and shooters for their contrast enhancement and depth perception properties. Brown lenses are also common among golfers, but cause color distortion. In some embodiments, the In certain embodiments, the can be blue, purple, and green for cosmetic purposes. Some sunglasses with interchangeable lenses have optional clear lenses to protect the eyes during low light or night time activities and a colored lens with UV protection for times where sun protection is needed.

In certain embodiments, the eyeglasses are 3D eyeglasses. 3D eyeglasses may create the illusion of three dimensions when viewing specially prepared 2D images. The classic 3D eyeglasses may have one red lens and one blue lens. Some 3D eyeglasses uses polarized filters, with one lens polarized vertically and the other horizontally, with the two images required for stereo vision polarized the same way.

In certain embodiments, the eyeglasses comprises multiple-focus lenses such as bifocal or trifocal lenses. Traditional multifocal lenses have two or three distinct viewing areas, each requiring a conscious effort of refocusing. Some modern multifocal lenses, such as progressive lenses, give a smooth transition between these different focal points.

In certain embodiments, the eyeglasses are three-piece rimless or semi-rimless eyeglasses. Three-piece rimless glasses generally have no frame around the lenses, and the bridge and temples are mounted directly onto the lenses. Semi-rimless (or half-rimless) glasses have a frame that only partially encircles the lenses (generally at the top portion).

In some embodiments, the polymer composition is used to make the eyeglass frames by the injection molding process according to the method disclosed herein. In general, injection molding is a process by which one or more polymers or polymer compositions are first fed into a hopper on an injection molding machine. Then the mixture is conveyed, melted and mixed thoroughly by one or more rotating screws inside the injection molding machine. The melt of the polymers or polymer compositions is injected under high pressure into a mold, the shape of which is the inverse of the desired shape, to form parts of the desired shape and size of the molded article such as an eyeglass frame. The mold can be made from metal, such as steel, aluminum and beryllium-copper alloy. After the melt cools within the heat-balanced mold, the molded article is removed from the mold and a new injection molding cycle begin. The injection molding of polymers has been described in Beaumont et al., "*Successful Injection Molding: Process, Design, and Simulation,*" Hanser Gardner Publications, Cincinnati, Ohio (2002), which is incorporated herein by reference in its entirety.

In some embodiment, the injection molding process conditions are selected such that the conditions do not cause deformation or distortion of the patterned layer or the laminate or the design pattern. In certain embodiment, the injection molding process conditions are selected such that the conditions cause deformation or distortion of the patterned layer or the laminate or the design pattern. In certain embodiments, the mold pressure is from about 30 MPa to about 110 MPa and the mold temperature is from about 45° C. to about 80° C.

In certain embodiments, the mold pressure is from about 10 MPa to about 200 MPa, from about 15 MPa to about 175 MPa, from about 20 MPa to about 150 MPa, from about 25 MPa to about 125 MPa, from about 30 MPa to about 110 MPa, or from about 35 MPa to about 100 MPa.

In some embodiments, the mold temperature is from about 25° C. to about 150° C., from about 30° C. to about 125° C., from about 35° C. to about 100° C., from about 40° C. to about 90° C., from about 45° C. to about 80° C. or from about 50° C. to about 75° C.

Different types of injection molding processes known to a skilled artisan can be used herein. Some non-limiting examples of different types of injection molding processes include structural foam molding, injection-compression molding, inmolding, back molding, two-shot molding, reaction injection molding, sandwich molding and the gas-injection molding, soluble core molding, insert molding, liquid injection molding, gas counterflow molding, and melt counterflow molding.

In some embodiments, the injection molding process is structural foam molding, which is also known as integral skin foaming, foam molding or foamed gas-counter pressure. It may be used to produce plastic structures with nearly uniform-density foam cores and integral near-solid skins.

In certain embodiments, the injection molding process is injection-compression molding which is also known as injection stamping or coining. It may be used to produce thick-walled articles, free of warping or sink-marks. It is presently even employed for producing moldings with long flow-paths.

In some embodiments, the injection molding process is injection-compression molding which can be divided into two phases: injection phase and compression phase. During the injection phase, a melt is injected into the mold as a short shot, which is open for just the length of the necessary compression stroke. As the cavity's volume is larger than that of the subsequently produced molding, the injected melt accumulates as bulk. During the compression phase, this bulk is spread and pressed into shape inside the cavity by the closing of the moving mold half. The sprue-bush is shut off when the start of the compression phase which may prevent the melt escaping from the mold cavity.

In certain embodiments, the injection molding process is inmolding which is also known as inmold or two (or more) component molding. This process comprises some overmolding techniques such as back molding and two shot molding.

In some embodiments, the injection molding process is back molding which is also known as low pressure injection molding. It is a method for producing decor moldings by the injection molding process. The moldings are composed of a thermoplastic substrate and decor material. The decor material may consist of film, textiles and so on. The decor material is draped inside the mold and back-injected with the material forming the substrate.

In certain embodiments, the injection molding process is two-shot molding which is also known as overmolding, two-color shuttle molding or two-color rotary molding. Two materials are molded, such that the molded shot is overmolded by the second molded shot. The first molded part is positioned so that the second material can be molded around, over or through the first one. The two materials can be the same or different and they can be molded to bond together or not bond together.

In some embodiments, the injection molding process is reaction injection molding which is also known as liquid injection molding. Reaction injection molding is a processing technique for the formation of polymer parts by direct polymerization in the mold through a mixing activated reaction. Two reactive monomeric liquids are mixed together by high-pressure impingement and injected into a closed mold at low pressure. In the mold, polymerization and usually phase separation occur, the polymer part solidifies and is then ejected. Reaction injection molding can be used for molding polyurethanes, epoxies, nylons and other liquid chemical systems.

In certain embodiments, the injection molding process is sandwich molding or the gas-injection molding (aka gas-assisted injection molding or internal gas-pressure method). In either technique, two different components are introduced into each other. A polymer melt is injected into the cavity first, and followed by the injection of the second component. The second component then expands inside the melt. With the sandwich process, the second component also consists of a polymer, thus creating a sandwich structure, comprised of an inner core, covered by an outer skin. With the gas-injection technique, an inert gas (e.g., nitrogen) is employed as the second component, thereby creating a hollow body.

In some embodiments, the injection molding process is soluble core molding. In this process, a core (usually molded of a low melting alloy or water-soluble thermoplastics or wax formulations, etc.) is inserted into the injection mold cavity. This core can be of thin walled or solid construction. After the plastic solidifies, the core is removed by applying a temperature below the melting point of the plastic and above the melting point of the core. Core material is poured through a hole drilled in the plastic or through an existing opening. The collected core material can be used for making a new core.

In certain embodiments, the injection molding process is insert molding which is a process by which components such as pins, studs, terminals, devices and fasteners may be molded in a part to eliminate the expense of postmolding, protection, preservation and so on.

In some embodiments, the injection molding process is liquid injection molding which involves proportioning, mixing and dispensing two liquid plastic formulations. Compound is directed into a closed mold. Liquid injection molding differs from reaction injection molding. Liquid injection molding may use mechanical mixing whereas reaction injection molding may use high-pressure impingement mixer.

In certain embodiments, the injection molding process is gas counterflow molding which is also known as gas counter pressure molding. A conventional injection molding system is used with a separate entrance to the mold cavity providing gas (e.g., nitrogen) pressurization prior to injection the melt shot. Back pressure in the cavity can provide an even distribution of melt package during its cooling cycle. When producing foamed plastic parts, this gas back pressure prevents the blowing agent from expanding until its part skins can form on the cavity surfaces where the gas is vented.

In some embodiments, the injection molding process is melt counterflow molding which uses two separate injection units or one unit with a melt-splitting device, so that the melt flow within the cavity arrives from different directions, this may result in complete elimination of any weld line.

The polymers or polymer compositions can be used to prepare the eyeglasses by other known polymer processes such as extrusion (e.g., sheet extrusion and profile extrusion), molding, and rotational molding. In general, extrusion is a process by which a polymer is propelled continuously along a screw through regions of high temperature and pressure where it is melted and compacted, and finally forced through a die. The extruder can be a single screw extruder, a multiple screw extruder, a disk extruder or a ram extruder. The die can be profile extrusion die. The extrusion of polymers has been described in C. Rauwendaal, "*Polymer Extrusion*", Hanser Publishers, New York, N.Y. (1986); and M. J. Stevens, "*Extruder Principals and Operation,*" Ellsevier Applied Science Publishers, New York, N.Y. (1985), both of which are incorporated herein by reference in their entirety.

The following examples are presented to exemplify embodiments of the invention. All numerical values are approximate. When numerical ranges are given, it should be understood that embodiments outside the stated ranges may still fall within the scope of the invention. Specific details described in each example should not be construed as necessary features of the invention.

EXAMPLES

Example 1

Making an Eyeglass Temple Having a Two-Layer Structure with a Design Pattern

Figure 2:
FIG. 2 depicts a process comprising the step of forming a patterned layer (10) in the shape of a temple having the design pattern (1) on one of its surfaces by converting the patterned laminate (5) into the patterned layer (10).
Figure 3:
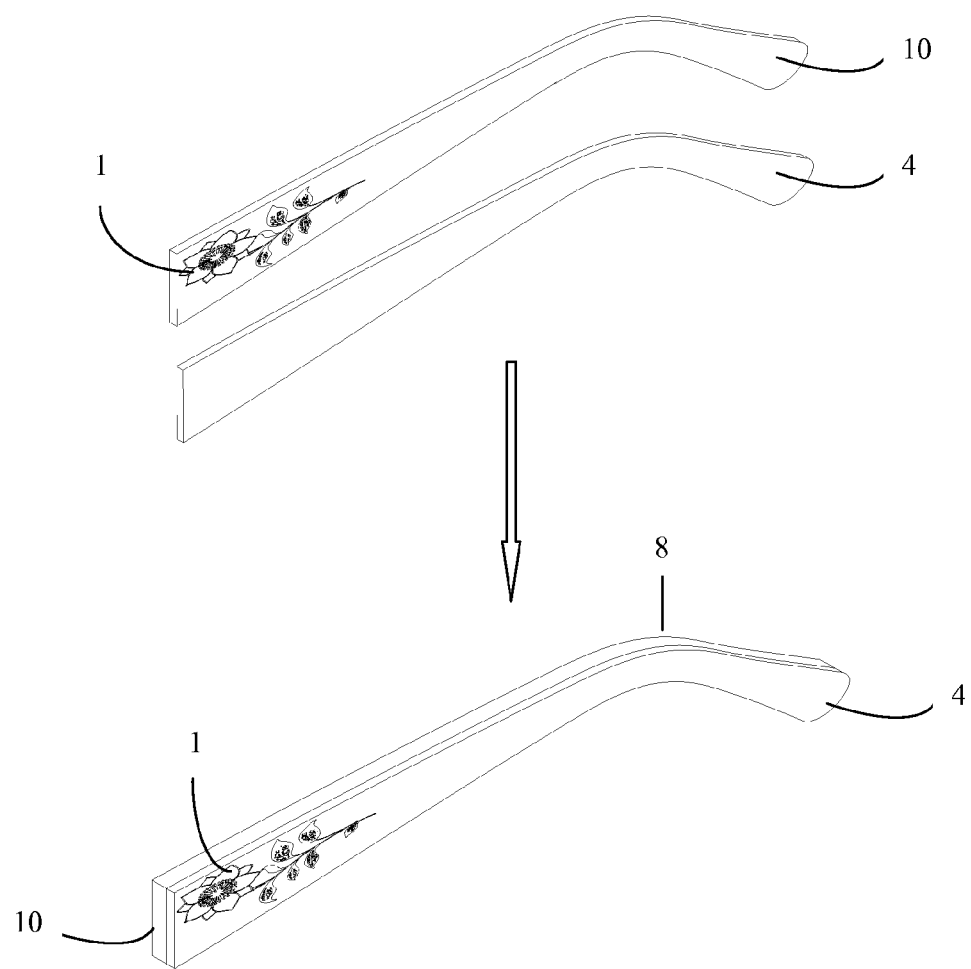
FIG. 3 depicts a process of forming a molded temple (8) having a two-layer structure, wherein a transparent top layer (4) is formed on the patterned layer (10) by injection molding such that the design pattern (1) is in or near the interface of the transparent top layer (4) and the patterned layer (10).

A design pattern (1) was first designed with a computer. The design pattern (1) was printed on a transfer sheet (6) by using a printer with sublimation inks wherein the humidity during the printing process was from about 45% to about 80%. The design pattern (1) was then printed from the transfer sheet (6) to a surface of a laminate (2) by heat press transfer printing to form a patterned laminate (5) as shown in FIG. 1 (the heat press was not shown). The transfer temperature was from about 150° C. to about 200° C. and the transfer time was from about 30 seconds to about 200 seconds. The laminate (2) with the design pattern (1) was converted into a patterned layer (10) having the shape of a temple as shown in FIG. 2. The patterned layer (10) was coated with JP-202, a lamination agent comprising triethyl citrate and cyclohexanone. Referring to FIG. 3, the patterned layer (10) was set in the cavity of a mold of the injection molding machine (not shown), wherein the injection molding machine was a 45 tons vertical injection molding machine. A polymer melt comprising cellulose acetate was injected into the cavity of the mold (not shown) under pressure to form a transparent top layer (4) after cooling on the patterned layer (10) wherein the design pattern (1) was in or near the interface of the transparent top layer (4) and the patterned layer (10) as shown in FIG. 3. The mold pressure was from about 30 MPa to about 110 MPa; the mold temperature was from 45° C. to about 80° C.; the injection temperature was from about 190° C. to about 210° C.; and the injection time was from about one second to about 5 seconds.

The molded temple (8) having the design pattern (1), the transparent top layer (4) and the patterned layer (10) was removed from the mold.

Example 2

Making an Eyeglass Temple Having a Three-Layer Structure with a Design Pattern

Figure 4:
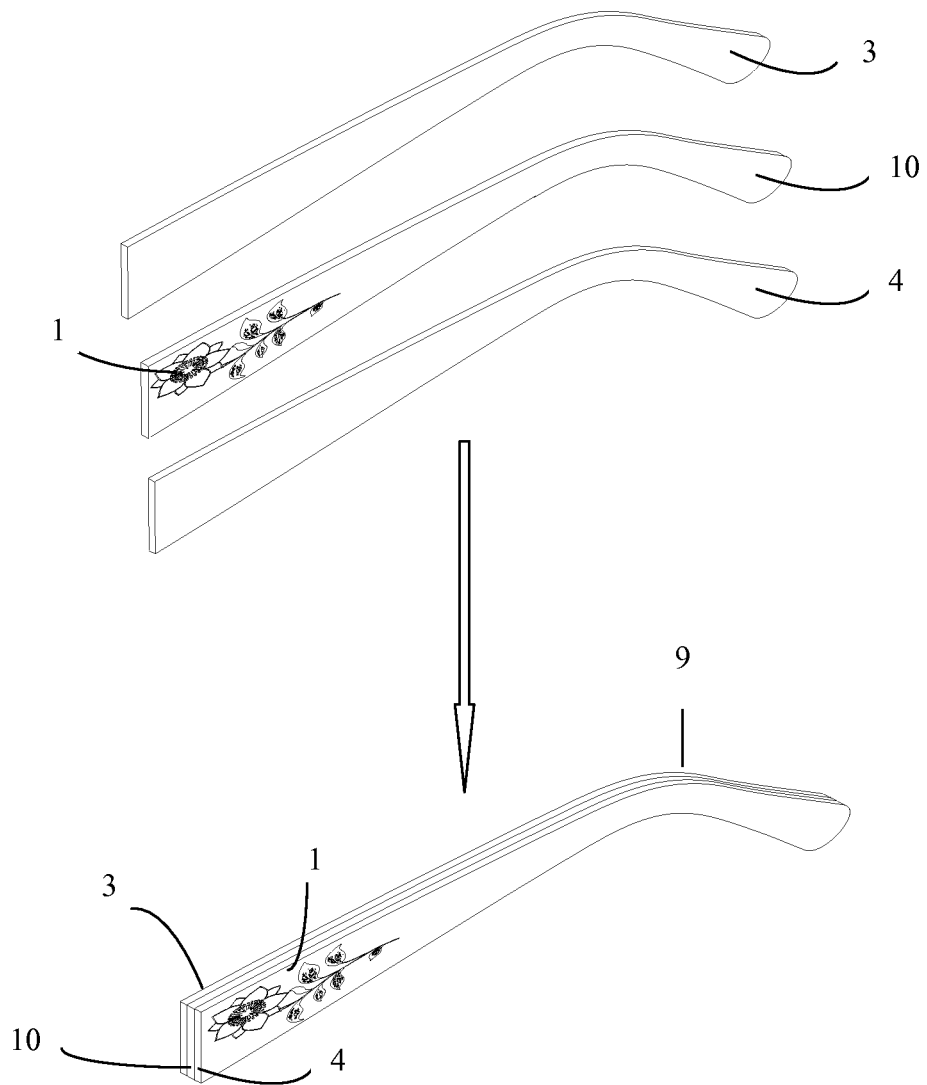
FIG. 4 depicts a process of forming a molded temple (9) having a three-layer structure, wherein a transparent top layer (4) and a bottom layer (3) are formed by injection molding such that the patterned layer (10) is between the transparent top layer (4) and the bottom layer (3) and the design pattern (1) is in or near the interface of the transparent top layer (4) and the patterned layer (10).

A design pattern (1) was first designed with a computer. The design pattern (1) was printed on a transfer sheet (6) by using a printer with sublimation inks wherein the humidity during the printing process was from about 45% to about 80%. The design pattern (1) was then printed from the transfer sheet (6) to a surface of a laminate (2) by heat press transfer printing to form a patterned laminate (5) as shown in FIG. 1 (the heat press was not shown). The transfer temperature was from about 150° C. to about 200° C. and the transfer time was from about 30 seconds to about 200 seconds. The laminate (2) with the design pattern (1) was converted into a patterned layer (10) having the shape of a temple as shown in FIG. 2. The patterned layer (10) was coated with JP-202, a lamination agent. Referring to FIG. 4, the patterned layer (10) was set in the cavity of a mold of the injection molding machine (not shown), wherein the injection molding machine was a 45 tons vertical injection molding machine. A polymer melt comprising cellulose acetate was injected into the cavity of the mold (not shown) under pressure to form a top layer (4) and a bottom layer (3) simultaneously after cooling such that the patterned layer (10) was between the top layer (4) and the bottom layer (3) and the design pattern (1) was in or near the interface of the top layer (4) and the patterned layer (10). The mold pressure was from about 30 MPa to about 110 MPa; the mold temperature was from 45° C. to about 80° C.; the injection temperature was from about 190° C. to about 210° C.; and the injection time was from about one second to about 5 seconds. The molded temple (9) having the design pattern (1), the top layer (4), the bottom layer (3) and the patterned layer (10) was removed from the mold.

The polymer melt comprising cellulose acetate can be injected into the cavity of the mold under pressure to form the top layer (4) and the bottom layer (3) simultaneously or sequentially. In some embodiments, the top layer (4) and the bottom layer (3) are formed simultaneously. In certain embodiments, the top layer (4) and the bottom layer (3) are formed sequentially where the top layer is formed first and then the bottom layer is formed. In other embodiments, the top layer (4) and the bottom layer (3) are formed sequentially where the bottom layer is formed first and then the top layer is formed. In some embodiments, the polymer melt for the top layer and the polymer melt for the bottom layer are the same. In some embodiments, the polymer melt for the top layer and the polymer melt for the bottom layer are the different.

Example 3

Figure 5:
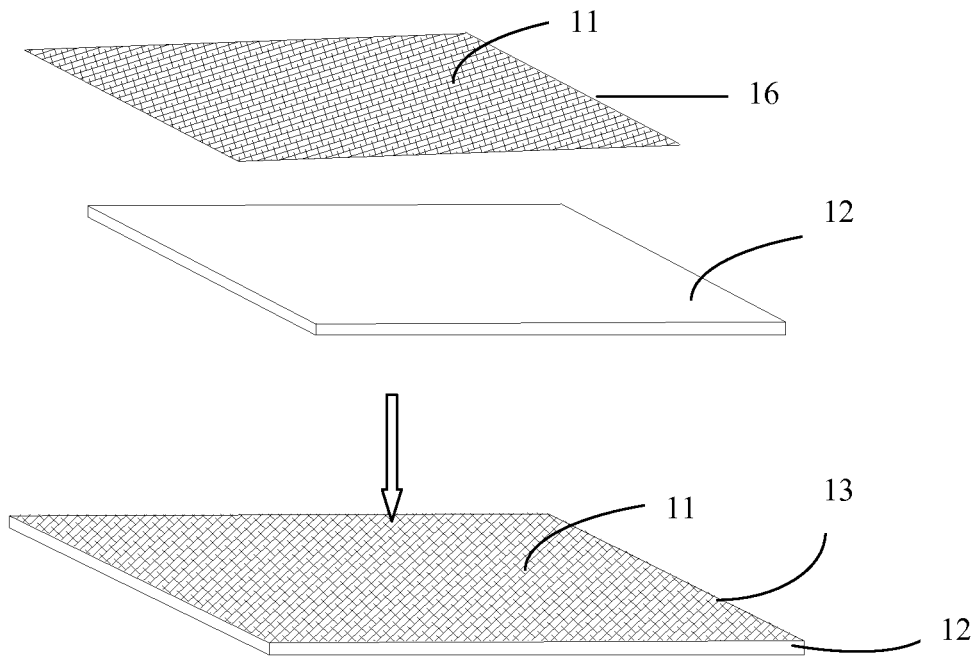
FIG. 5 depicts a process of forming a patterned laminate (13) having a design pattern (11) by transferring the design pattern (11) from a transfer sheet (16) to a laminate (12).
Figure 6:
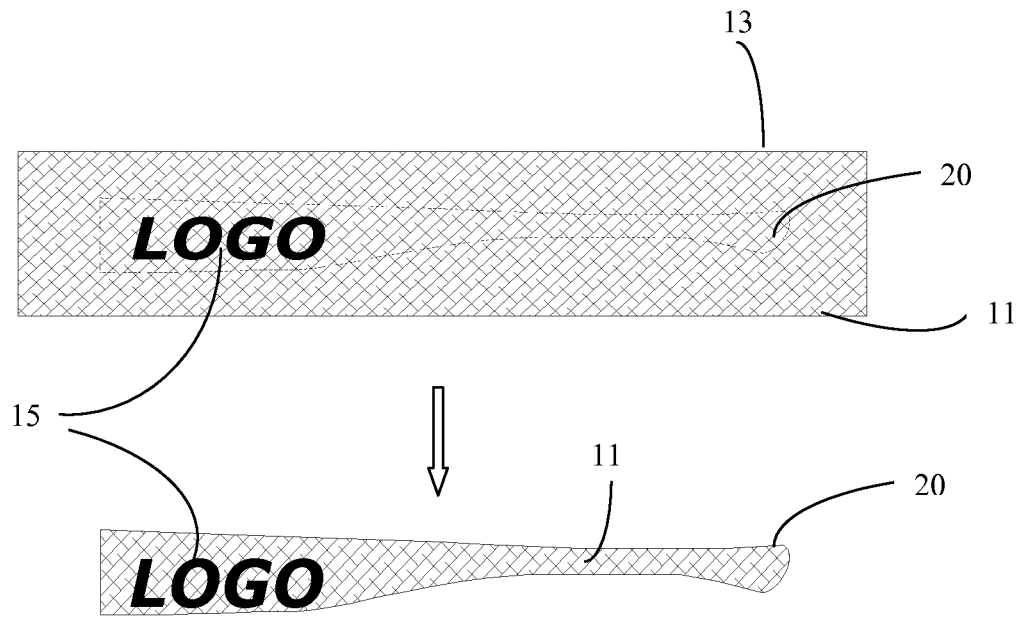
FIG. 6 depicts a process of forming a patterned layer (20) in the shape of a temple having a design pattern (11) and a logo (15) by first positioning the logo (15) on the patterned surface of the patterned laminate (13) and then by converting the patterned laminate (13) having the logo (15) into the patterned layer (20). The logo (15) can also be positioned on the surface opposite to the patterned surface of the patterned laminate (13). In some embodiments, the logo (15) can be replaced with one or more particles, one or more of other three dimensional articles or a combination thereof. In certain embodiments, one or more particles or one or more of three dimensional articles can be positioned on any surface of the patterned layer, the top layer or a combination thereof. in one or more indentations.
Figure 7:
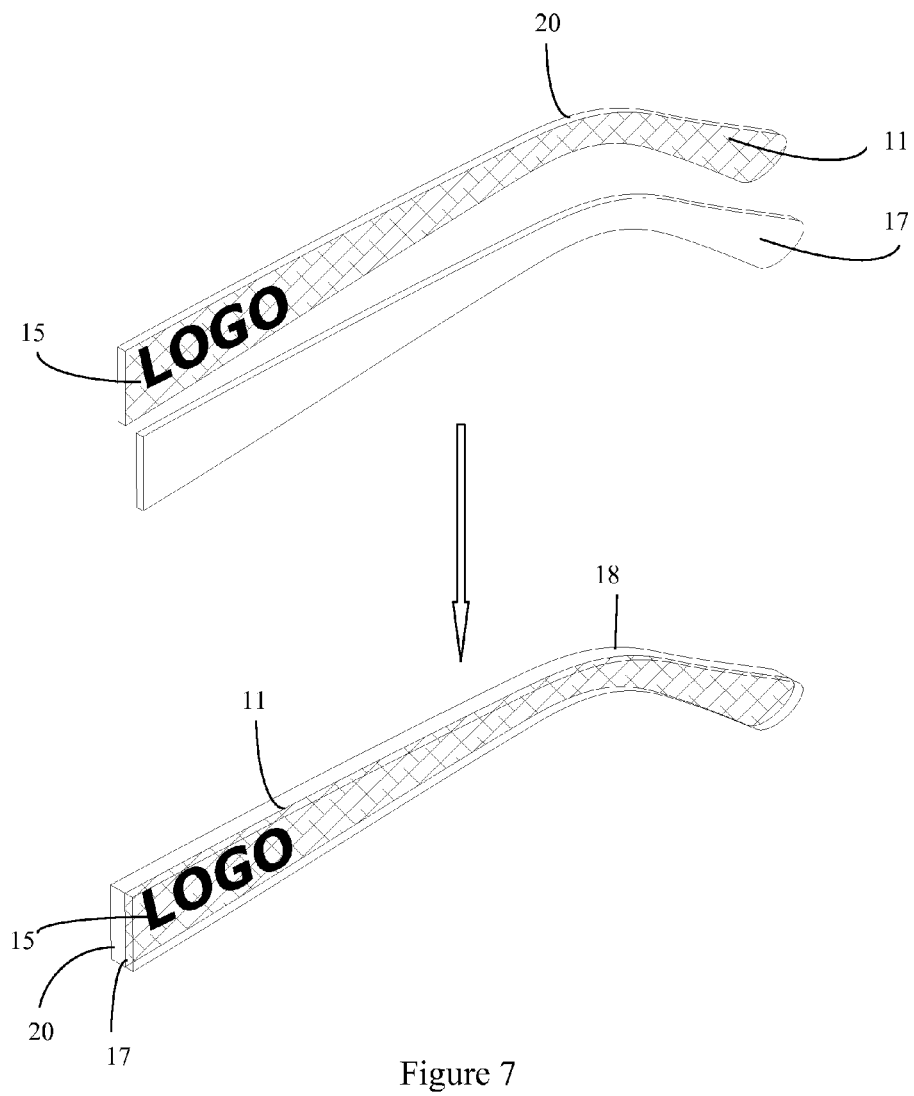
FIG. 7 depicts a process of forming a molded temple (18) having a two-layer structure, wherein a transparent top layer (17) is formed on the patterned layer (20) by injection molding such that the design pattern (11) and logo (15) are in or near the interface of the transparent top layer (17) and the patterned layer (20).

Making an Eyeglass Temple Having a Two-Layer Structure with a Design Pattern and a Metal Logo A design pattern (11) was first designed with a computer. The design pattern (11) was printed on a transfer sheet (16) by using a printer with sublimation inks wherein the humidity during the printing process was from about 45% to about 80%. The design pattern (11) was then printed from the transfer sheet (16) to a laminate (12) by heat press transfer printing to form a patterned laminate (13) as shown in FIG. 5 (the heat press was not shown). The transfer temperature was from about 150° C. to about 200° C. and the transfer time was from about 30 seconds to about 200 seconds. Referring to FIG. 6, a metal logo (15) was placed on top of the patterned laminate (13). The patterned laminate (13) with the design pattern (11) and metal logo (15) was converted into a patterned layer (20) having the shape of a temple as shown in FIG. 6. The patterned layer (20) was coated with JP-202, a lamination agent. Referring to FIG. 7, the patterned layer (20) was set in the cavity of the mold of the injection molding machine (not shown), wherein the injection molding machine was a 45 tons vertical injection molding machine. A polymer melt comprising cellulose acetate was injected into the cavity of the mold (not shown) under pressure to form a transparent top layer (17) after cooling on the patterned layer (20) wherein the design pattern (11) and metal logo (15) are in or near the interface of the transparent top layer (17) and the patterned layer (20) as shown in FIG. 7. The mold pressure was from about 30 MPa to about 110 MPa; the mold temperature was from 45° C. to about 80° C.; the injection temperature was from about 190° C. to about 210° C.; and the injection time was from about one second to about 5 seconds. The molded temple (18) having the design pattern (11), the metal logo (15), the transparent top layer (174) and the patterned layer (20) was removed from the mold.

Figure 8:
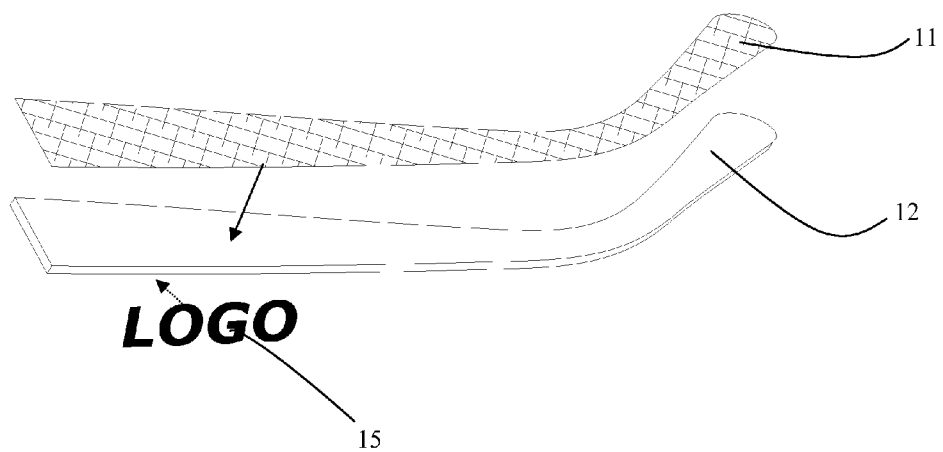
FIG. 8 depicts a process of forming a patterned layer in the shape of a temple, wherein a design pattern (11) is printed on a surface of a laminate (12) in the shape of the temple; and logo (15) is positioned on the other surface of the laminate (12) opposite to the design pattern (11).
Figure 8:
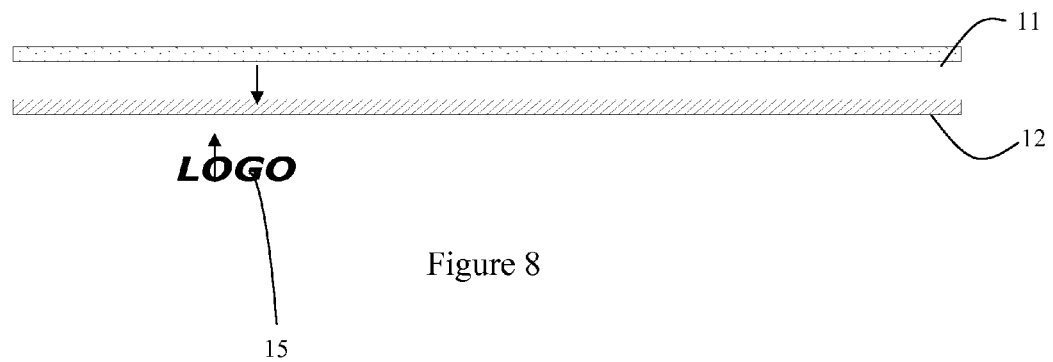

Referring to FIG. 8, a design pattern (11) was printed on a surface of a laminate (12) in the shape of a temple; and logo (15) was positioned on the other surface of the laminate (12) opposite to the design pattern (11) to form a pattern layer. Then the patterned layer can be set in the cavity of the mold of the injection molding machine. A polymer melt comprising cellulose acetate can be injected into the cavity of the mold under pressure to form a top layer and/or a bottom layer on the patterned layer.

Example 4

Figure 9:
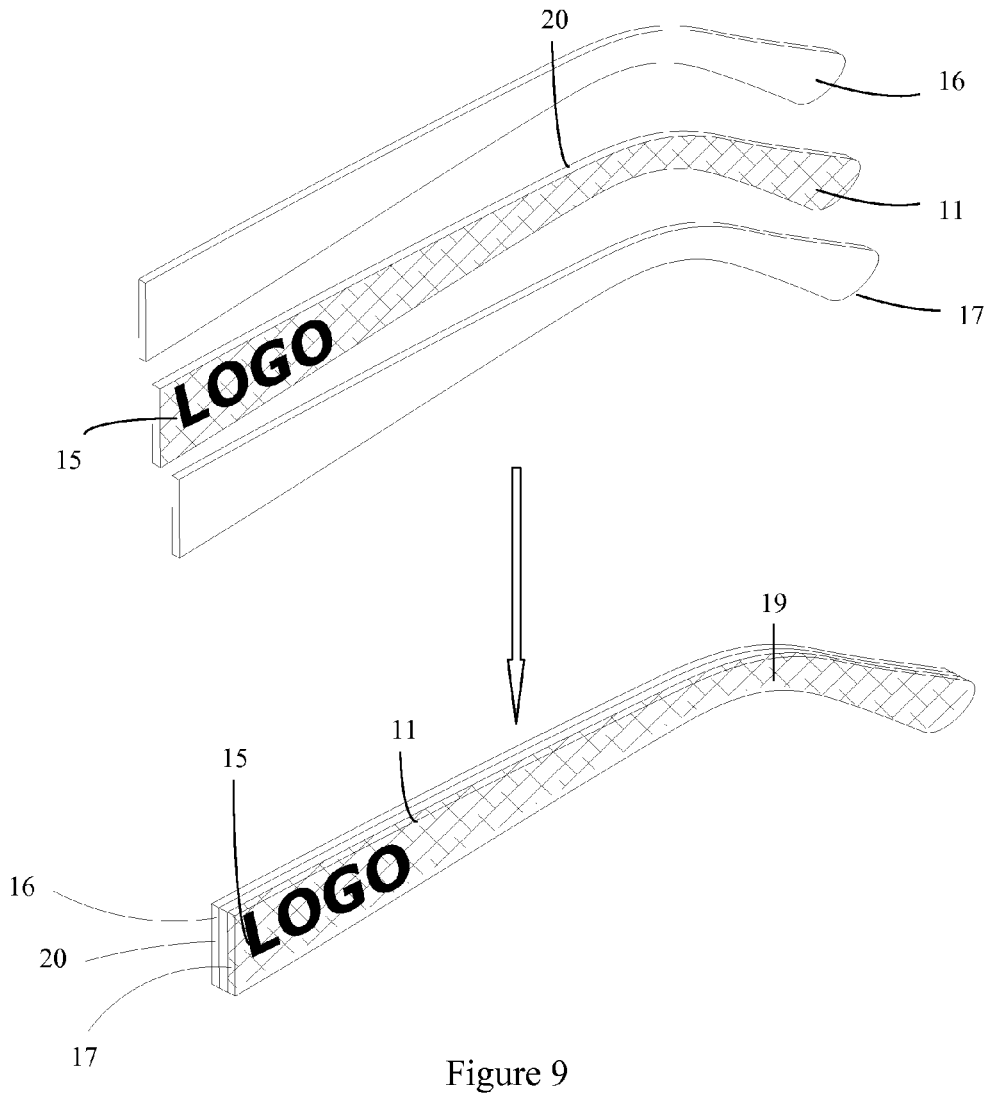
FIG. 9 depicts a process of forming a molded temple (19) having a three-layer structure, wherein a transparent top layer (17) and a bottom layer (16) are formed by injection molding such that the patterned layer (20) is between the transparent top layer (17) and bottom layer (16) and the design pattern (11) and logo (15) are in or near the interface of the transparent top layer (17) and the patterned layer (20).

Making an Eyeglass Temple Having a Three-Layer Structure with a Design Pattern and a Metal Logo A design pattern (11) was first designed with a computer. The design pattern (11) was printed on a transfer sheet (16) by using a printer with sublimation inks wherein the humidity during the printing process was from about 45% to about 80%. The design pattern (11) was then printed from the transfer sheet (16) to a laminate (12) by heat press transfer printing to form a patterned laminate (13) as shown in FIG. 5 (the heat press was not shown). The transfer temperature was from about 150° C. to about 200° C. and the transfer time was from about 30 seconds to about 200 seconds. Referring to FIG. 6, a metal logo (15) was positioned on top of the patterned laminate (13) with an adhesive. The patterned laminate (13) with the design pattern (11) and metal logo (15) was converted into a patterned layer (20) having the shape of a temple as shown in FIG. 6. The patterned layer (20) was coated with JP-202, a lamination agent. Referring to FIG. 9, the patterned layer (20) was set in the cavity of the mold of the injection molding machine (not shown), wherein the injection molding machine was a 45 tons vertical injection molding machine. A polymer melt comprising cellulose acetate was injected into the cavity of the mold (not shown) under pressure to form a top layer (17) and a bottom layer (16) after cooling on the patterned layer (20) wherein the design pattern (11) and metal logo (15) are in or near the interface of the top layer (17) and the patterned layer (20) as shown in FIG. 9. The mold pressure was from about 30 MPa to about 110 MPa; the mold temperature was from 45° C. to about 80° C.; the injection temperature was from about 190° C. to about 210° C.; and the injection time was from about one second to about 5 seconds. The molded temple (19) having the design pattern (11), the metal logo (15), the top layer (17), the bottom layer (16) and the patterned layer (20) was removed from the mold.

In certain embodiments, the metal logo (15) can be positioned with an adhesive on one or more surfaces of the patterned layer. In some embodiments, the metal logo (15) can be positioned in one or more indentations on one or more surfaces of the patterned layer. In certain embodiments, the metal logo (15) can be bonded to the one or more indentations by an adhesive. In other embodiments, the metal logo (15) can be positioned on one or more surfaces of the patterned layer with other techniques known to a skilled artisan. In further embodiments, the metal logo (15) can be positioned on a surface opposite to the design pattern (11). In still further embodiments, the metal logo (15) can be positioned on the same surface with the design pattern (11).

The polymer melt comprising cellulose acetate can be injected into the cavity of the mold under pressure to form the top layer (17) and the bottom layer (16) simultaneously or sequentially. In some embodiments, the top layer (17) and the bottom layer (16) are formed simultaneously. In certain embodiments, the top layer (17) and the bottom layer (16) are formed sequentially where the top layer is formed first and then the bottom layer is formed. In other embodiments, the top layer (17) and the bottom layer (16) are formed sequentially where the bottom layer is formed first and then the top layer is formed. In some embodiments, the polymer melt for the top layer and the polymer melt for the bottom layer are the same. In some embodiments, the polymer melt for the top layer and the polymer melt for the bottom layer are the different.

Example 5

Making an Eyeglass Temple with a Design Pattern

Figure 10:
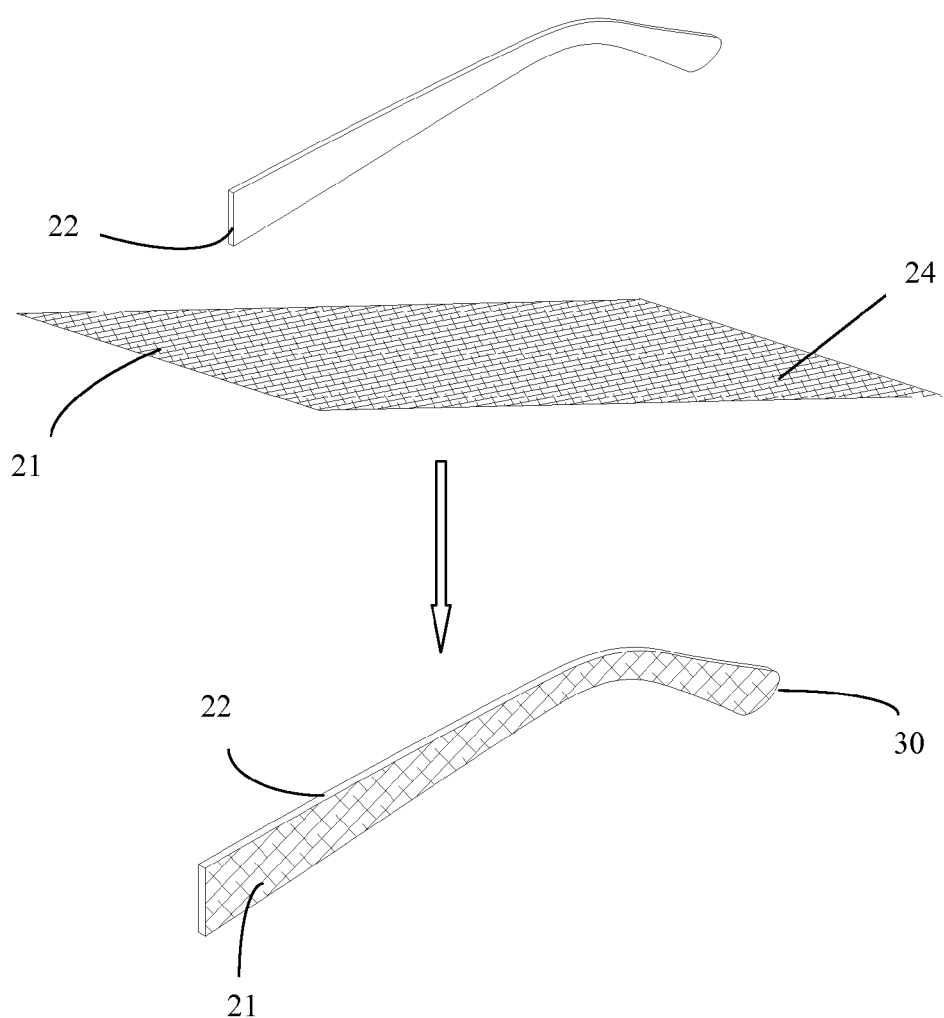
FIG. 10 depicts a process of forming a patterned layer (30) in the shape of a temple by first forming a shaped laminate (22) in the form of temple from a laminate; and then by transferring a design pattern (21) from a transfer sheet (24) to the shaped laminate (22).
Figure 11:
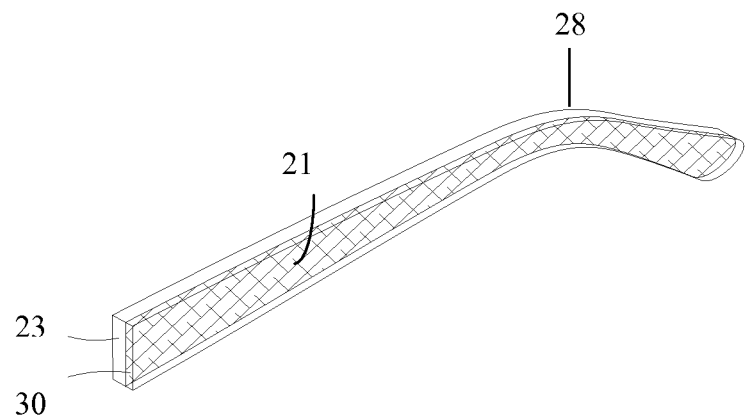
FIG. 11 depicts a process of forming a molded temple (28) having a two-layer structure by forming a bottom layer (23) on the patterned layer (30) by injection molding.
Figure 12:
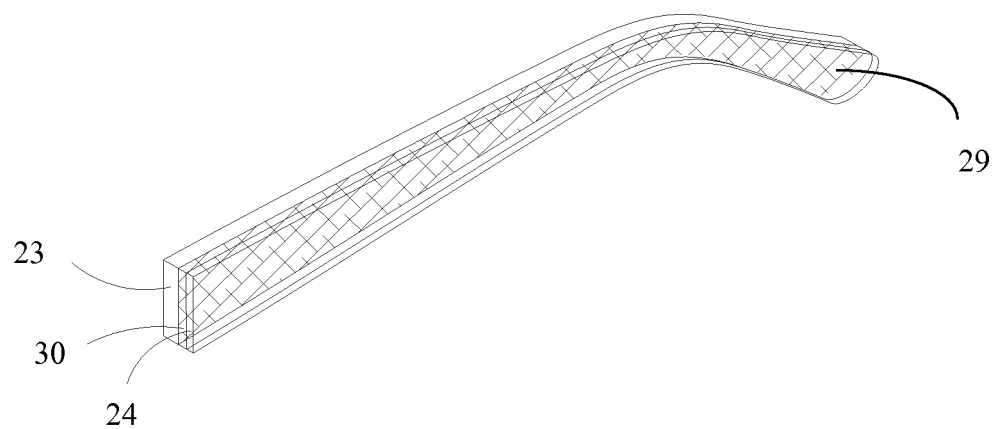
FIG. 12 depicts a process of forming a molded temple (29) having a three-layer structure by forming a transparent top layer (24) on the molded temple (28) by injection molding such that the design pattern (21) is in or near the interface of the transparent top layer (23) and the patterned layer (30).

A laminate (22) in the shape of a temple as shown in FIG. 10 was obtained. A design pattern (21) was first designed with a computer. The design pattern (21) was printed on a transfer sheet (24) by using a printer with sublimation inks wherein the humidity during the printing process was from about 45% to about 80%. The design pattern (21) was then printed from the transfer sheet (24) to the laminate (22) by heat press transfer printing to form a patterned layer (30) having the shape of a temple as shown in FIG. 10 (the heat press was not shown). The transfer temperature was from about 150° C. to about 200° C. and the transfer time was from about 30 seconds to about 200 seconds. The patterned layer (30) was coated with JP-202, a lamination agent. Referring to FIG. 11, the patterned layer (30) was set in the cavity of the mold of the injection molding machine (not shown), wherein the injection molding machine was a 45 tons vertical injection molding machine. A first polymer melt was injected into the cavity of the mold (not shown) under high pressure to put a bottom layer (23) on a surface of the patterned layer (30) as shown in FIG. 11. The mold pressure was from about 30 MPa to about 110 MPa; the mold temperature was from about 45° C. to about 80° C.; the injection temperature was from about 190° C. to about 210° C.; and the injection time was from about one second to about 5 seconds. Referring to FIG. 12, a second polymer melt, which was different from the first polymer melt, was injected into the cavity of the mold (not shown) under high pressure to put a top layer (24) on the other surface of the patterned layer (30). After the polymer melts cooled and formed the top layer (24) and the bottom layer (23) above and below the patterned layer (30) as shown in FIG. 12, the molded temple (29) having the design pattern (21) was removed from the mold.

While the invention has been described with respect to a limited number of embodiments, the specific features of one embodiment should not be attributed to other embodiments of the invention. No single embodiment is representative of all aspects of the invention. In certain embodiments, the first polymer melt in Example 3 above may be the same or different from the second polymer melt in chemical composition. In other embodiments, the top layer may be formed before the bottom layer is formed. In some embodiments, the methods may include numerous steps not mentioned herein. In other embodiments, the methods do not include, or are substantially free of, any steps not enumerated herein. Variations and modifications from the described embodiments exist. The appended claims intend to cover all those modifications and variations as falling within the scope of the invention.

What is claimed is:

1. A method of making an eyeglass frame comprising a frame front and/or a pair of temples, wherein each of the frame front and temples independently comprises a top layer and a patterned layer having the shape of a frame front and/or a pair of temples, and wherein the patterned layer comprises a laminate and a design pattern printed on a surface of the laminate by transfer printing, the method comprising the steps of:
   a) providing a mold having a cavity, wherein the shape of the cavity corresponds to the shape of the frame front and/or the temples;
   b) setting the patterned layer for the frame front and/or the temples in the mold; and
   c) injecting a melt of a first polymer composition into the cavity to form the top layer, wherein the transfer printing is thermal transfer printing, dye diffusion transfer printing or dye sublimation transfer printing, and wherein the method further comprises the step of coating the patterned layer with a lamination agent before the injecting step.

2. The method of claim 1, wherein the design pattern is in or near the interface of the top layer and the patterned layer.

3. The method of claim 1, wherein at least one of the frame front and temples further comprises a bottom layer, wherein the patterned layer is between the top layer and the bottom layer, and wherein the bottom layer was formed by injecting a melt of a second polymer composition into the cavity after or at the same time as the top layer is formed.

4. The method of claim 3, wherein the first polymer composition and the second polymer composition are the same or different chemically.

5. The method of claim 1, wherein the transfer printing is thermal transfer printing.

6. The method of claim 5, wherein the transfer printing is dye diffusion thermal transfer printing.

7. The method of claim 5, wherein the transfer printing is dye sublimation transfer printing.

8. The method of claim 7, wherein the design pattern is transferred onto the laminate from a transfer sheet having a mirror image of the design pattern.

9. The method of claim 7, wherein the transfer temperature is from about 150° C. to about 200° C. and the transfer time is from about 30 seconds to about 200 seconds.

10. The method of claim 7, wherein the mirror image of the design pattern is printed on the transfer sheet by using a printer with sublimation inks.

11. The method of claim 1, wherein the design pattern is designed with a computer.

12. The method of claim 1, wherein the patterned layer or the top layer further comprises one or more particles, one or more three dimensional articles, one or more fluids or a combination thereof.

13. The method of claim 12, wherein the one or more three dimensional articles are selected from dry flowers, dry leaves, precious gems or stones, artificial gemstones, metallic ornaments, metallic foils, metallic logos, metallic design patterns, plastic ornaments, plastic foils, plastic logos, plastic design patterns and combinations thereof.

14. The method of claim 3, wherein each of the laminate, the first polymer composition and the second polymer composition independently comprises a polymer which is a cellulose ester, a polycarbonate, a polyurethane, a thermoplastic elastomer (TPE), a polyamide or nylon, a polyester, a copolyester or a combination thereof.

15. The method of claim 14, wherein the polymer is cellulose acetate, cellulose acetate propionate, a polycarbonate, a polyamide, a polyester, a copolyester or a combination thereof.

16. The method of claim 1, wherein an injection molding machine is used for the injecting step.

17. The method of claim 16, wherein the mold pressure is from about 30 MPa to about 110 MPa.

18. The method of claim 17, wherein the mold temperature is from about 45° C. to about 80° C.

19. The method of claim 1, wherein the eyeglass frame comprises a frame front connected to a pair of temples with a pair of hinges.

20. The method of claim 1, wherein the eyeglass frame comprises a pair of temples integrally bonded to a frame front.

21. The method of claim 1, wherein the eyeglass frame is a rimless frame comprising a pair of temples without a frame front.

22. The method of claim 1, wherein the patterned layer is formed by transferring the design pattern from a transfer sheet to a laminate having the shape of the frame front and/or the temples.

23. The method of claim 1, wherein the patterned layer is formed by transferring the design pattern from a transfer sheet to a laminate to form a patterned laminate and then by converting the patterned laminate into the patterned layer.

24. The method of claim 1, further comprising setting a metal core in the mold before step c).

25. The method of claim 24, wherein the metal core comprises a stainless steel, Ni—Ti alloy, Cu—Zn—Al alloy, aluminum, titanium, magnesium, copper, brass or combination thereof.

26. The method of claim 1, wherein each of the laminate and the first polymer composition independently comprises a polymer which is a cellulose ester, a polycarbonate, a polyurethane, a thermoplastic elastomer (TPE), a polyamide or nylon, a polyester, a copolyester or a combination thereof.

27. The method of claim 26, wherein the polymer is cellulose acetate, cellulose acetate propionate, a polycarbonate, a polyamide, a polyester, a copolyester or a combination thereof.

28. The method of claim 12, wherein the one or more particles, one or more three dimensional articles or a combination thereof are positioned in one or more indentations on one or more surfaces of the patterned layer, the top layer or a combination thereof.

29. The method of claim 28, wherein the one or more particles, one or more three dimensional articles or a combination thereof are bonded to the one or more indentations by an adhesive.

30. The method of claim 1, wherein the lamination agent comprises an alkyl citrate.

31. A method of making an eyeglass frame comprising a frame front and/or a pair of temples, wherein each of the frame front and temples independently comprises a top layer and a patterned layer having the shape of a frame front and/or a pair of temples, and wherein the patterned layer comprises a laminate and a design pattern on a surface of the laminate, the method comprising the steps of:
 a) providing a mold having a cavity, wherein the shape of the cavity corresponds to the shape of the frame front and/or the temples;
 b) setting the patterned layer for the frame front and/or the temples in the mold; and
 c) injecting a melt of a first polymer composition into the cavity to form the top layer,
 wherein the method further comprises the step of coating the patterned layer with a lamination agent before the injecting step, and wherein the lamination agent comprises an alkyl citrate.

32. The method of claim 31, wherein the alkyl citrate is triethyl citrate.

* * * * *